(12) United States Patent
Zhou

(10) Patent No.: US 11,986,726 B2
(45) Date of Patent: May 21, 2024

(54) APPLICATION RUNNING METHOD AND ELECTRONIC DEVICE

(71) Applicant: Honor Device Co., Ltd., Shenzhen (CN)

(72) Inventor: Xiaopeng Zhou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 222 days.

(21) Appl. No.: 17/626,035

(22) PCT Filed: Jul. 16, 2020

(86) PCT No.: PCT/CN2020/102471
§ 371 (c)(1),
(2) Date: Jan. 10, 2022

(87) PCT Pub. No.: WO2021/008589
PCT Pub. Date: Jan. 21, 2021

(65) Prior Publication Data
US 2022/0249946 A1     Aug. 11, 2022

(30) Foreign Application Priority Data

Jul. 18, 2019 (CN) .......................... 201910651268.4

(51) Int. Cl.
*A63F 13/2145* (2014.01)
*A63F 13/52* (2014.01)
(Continued)

(52) U.S. Cl.
CPC .......... *A63F 13/2145* (2014.09); *A63F 13/52* (2014.09); *G06V 40/20* (2022.01); *H04N 23/63* (2023.01)

(58) Field of Classification Search
None
See application file for complete search history.

(56) References Cited

U.S. PATENT DOCUMENTS 10,067,645 B2   9/2018   King et al.
10,825,014 B2   11/2020  Pan
(Continued)

FOREIGN PATENT DOCUMENTS

CN   104992171 A   10/2015
CN   105912272 A   8/2016
(Continued)

OTHER PUBLICATIONS

"EVA Facial Mouse," Ease Apps, URL:https://easeapps.xyz/eva-facial-mouse-pro/.
(Continued)

*Primary Examiner* — Jason T Yen
(74) *Attorney, Agent, or Firm* — Leydig, Voit & Mayer, Ltd.

(57) ABSTRACT

An application running method and an electronic device are provided, and capable of implementing a function of using motion sensing actions to control a game by mapping motion sensing actions to touch operations on a touch screen. The method is applicable to an electronic device having at least one camera and a touch screen, the method including: displaying, by the electronic device, a first picture of a first application that supports a user controlling the first application through a touch operation on the touch screen; capturing, by the electronic device, a first image of the user by using the at least one camera, and recognizing a first motion sensing action of the user in the first image; and performing, by the electronic device, an operation corresponding to the first touch operation in response to determining the first touch operation information corresponding to the first motion sensing action.

15 Claims, 21 Drawing Sheets

(51) Int. Cl.
*G06V 40/20* (2022.01)
*H04N 23/63* (2023.01)

(56) References Cited

U.S. PATENT DOCUMENTS

| | | | | |
|---|---|---|---|---|
| 2010/0210364 | A1* | 8/2010 | York | A63F 13/10 |
| | | | | 463/43 |
| 2011/0248915 | A1* | 10/2011 | Lu | A63F 13/77 |
| | | | | 345/156 |
| 2014/0267167 | A1 | 9/2014 | Ricks | |
| 2015/0000026 | A1 | 1/2015 | Clements | |
| 2016/0030835 | A1 | 2/2016 | Argiro | |
| 2016/0054807 | A1* | 2/2016 | Flagg | A63F 13/2145 |
| | | | | 345/158 |
| 2016/0109954 | A1* | 4/2016 | Harris | G06V 20/20 |
| | | | | 345/156 |
| 2016/0206957 | A1* | 7/2016 | Goslin | G06F 3/011 |
| 2016/0279523 | A1* | 9/2016 | Altagar | A63F 13/2145 |
| 2017/0185142 | A1 | 6/2017 | Zhang | |
| 2018/0052518 | A1 | 2/2018 | Zhu et al. | |
| 2022/0249946 | A1 | 8/2022 | Zhou | |

FOREIGN PATENT DOCUMENTS

| | | |
|---|---|---|
| CN | 107577334 A | 1/2018 |
| CN | 107885543 A | 4/2018 |
| CN | 108227726 A | 6/2018 |
| CN | 104951211 B | 12/2018 |
| CN | 109388318 A | 2/2019 |
| CN | 109412906 A | 3/2019 |
| CN | 110559645 A | 12/2019 |
| RU | 2677381 C1 | 1/2019 |

OTHER PUBLICATIONS

Fundacion Vodafone Espana, "EVA Facial Mouse," URL: https://www.youtube.com/watch?v=ED4EgNoB8hs (Feb. 15, 2016).

* cited by examiner

APPLICATION RUNNING METHOD AND ELECTRONIC DEVICE

CROSS-REFERENCE TO RELATED APPLICATIONS

This application is a National Stage of International Application No. PCT/CN2020/102471, filed Jul. 16, 2020, which claims priority to Chinese Patent Application No. 201910651268.4, filed Jul. 18, 2019, both of which are hereby incorporated by reference in their entireties.

TECHNICAL FIELD

This application relates to the field of electronic technologies, and in particular, to an application running method and an electronic device.

BACKGROUND

Games have become an important entertainment function for people. A motion sensing game is an electronic game that is performed (operated) by a player through a change of motion sensing actions, and exercises a body while entertaining the player, thereby being popular with players.

However, most of existing motion sensing games require to be equipped with a peripheral device for recognizing body moving in addition to a game console. The peripheral device captures an image of a player and then recognizes a motion sensing action of the player based on the image, and the game console performs an operation corresponding to the motion sensing action. It can be seen that the player needs to purchase a dedicated peripheral device additionally to experience a motion sensing gameplay. In addition, a game manufacturer needs to specially develop a motion sensing game or specially develop a version supporting a motion sensing gameplay for an existing game. Furthermore, because software and hardware capabilities of different game consoles are different, supportable motion sensing actions are different, resulting in relatively high development costs of the motion sensing gameplay.

SUMMARY

This application provides an application running method and an electronic device, so that an application supporting touch control may also be controlled by using a motion sensing action of a user, thereby helping improve user experience and reduce development costs.

To achieve the foregoing objective, the following technical solutions are used in the embodiments of this application.

According to a first aspect, an application running method is provided and applicable to an electronic device having at least one camera and a touch screen. The method includes: displaying, by the electronic device, a first picture of a first application, where the first application supports a user controlling the first application through a touch operation on the touch screen; capturing, by the electronic device, a first image of the user by using at least one camera, and recognizing a first motion sensing action of the user in the first image; determining, by the electronic device, first touch operation information corresponding to the first motion sensing action, where the first touch operation information includes a type of a first touch operation and a position at which the first touch operation is performed on the touch screen; and performing, by the electronic device, an operation corresponding to the first touch operation in response to determining the first touch operation information corresponding to the first motion sensing action.

The first application may be any application installed on the electronic device, and the application may support a touch operation for control. For example, the first application may be a game application.

The operation corresponding to the first touch operation may be displaying another picture, or may be outputting a specific voice, or may be outputting another specific signal, or the like. The operation corresponding to the first touch operation is not limited in the embodiments of this application.

It can be seen that in this application, the motion sensing action is mapped to the touch operation originally supported by the first application, so that a function of which the first application supports a motion sensing gameplay can also be implemented without modifying native code of the first application, thereby improving usage experience of the first application. That is, in the method provided in this application, the function of supporting the motion sensing gameplay does not need to be developed separately for each first application, which is beneficial to reducing development costs.

In a possible implementation, the performing, by the electronic device, an operation corresponding to the first touch operation includes: displaying, by the electronic device, a second picture of the first application, where the second picture is the same as a picture displayed by the electronic device in response to that the user performs the first touch operation on the first picture.

In a possible implementation, the determining, by the electronic device, first touch operation information corresponding to the first motion sensing action includes: calling, by the electronic device, an interface of an application framework layer, and determining the first touch operation information corresponding to the first motion sensing action.

It can be seen that in this application, through a system service, the motion sensing action can be mapped to the touch operation originally supported by the first application, to implement the function of which the first application supports the motion sensing gameplay. That is, each first application supporting the touch operation can implement the function of supporting the motion sensing gameplay by calling the system service.

In a possible implementation, before the capturing, by the electronic device, a first image of the user by calling the at least one camera, the method further includes: receiving, by the electronic device, an operation in which the user enables a first function; and enabling, by the electronic device, the first function in response to the operation in which the user enables the first function, where the first function is a function of which the first application supports the user controlling the first application through a motion sensing action. It can be seen that the user can choose whether to enable a function of the motion sensing gameplay.

In a possible implementation, after the enabling, by the electronic device, the first function, the method further includes: adding, by the electronic device, a layer to a picture of the first application, where the layer includes a non-transparent region and a transparent region, and the non-transparent region displays a setting interface of the first function. Therefore, this application provides a method for displaying the setting interface of the first function, to facilitate the user to set the first function.

In a possible implementation, the method further includes: receiving, by the electronic device, an operation in which the user sets a correspondence between a motion sensing action and a touch operation by using the setting interface of the first function, where the touch operation includes a type of the touch operation and a position at which the touch operation is performed on the touch screen. It can be seen that in the method provided in this application, the user can set the correspondence between a motion sensing action and a touch operation, to achieve personalization and diversification of the motion sensing gameplay.

In a possible implementation, the type of the touch operation includes at least one of the following: a tap operation, a slide operation, a double-tap operation, a touch and hold operation, a finger joint knock operation, a multi-point touch operation, and a predefined gesture.

In a possible implementation, the method further includes: storing, by the electronic device, the setting of the user for the correspondence between the motion sensing action and the touch operation; and adding, by the electronic device, a second layer to the picture of the first application, where the second layer includes a non-transparent region and a transparent region, and the non-transparent region displays a preview window of the at least one camera. Therefore, the user can view a motion sensing action of the user by using the preview window of the camera, thereby improving the accuracy of using the motion sensing action by the user and improving usage experience of the user.

In a possible implementation, the at least one camera includes a depth camera.

In a possible implementation, the method further includes: enabling, by the electronic device, a screen mirroring function, and instructing another electronic device that is connected to the electronic device and that has a screen to display a picture of the electronic device. It can be seen that the electronic device can project a picture displayed by a screen to another large-screen electronic device, which is beneficial to improving visual experience of the user.

According to a second aspect, an electronic device is provided, including: at least one processor, a touch screen, and at least one camera, where the touch screen and the at least one camera are coupled with the processor. The touch screen is configured to display a first picture of a first application, where the first application supports a user controlling the first application through a touch operation on the touch screen; the at least one camera is configured to capture a first image of the user; and the at least one processor is configured to recognize a first motion sensing action of the user in the first image; determine first touch operation information corresponding to the first motion sensing action, where the first touch operation information includes a type of a first touch operation and a position at which the first touch operation is performed on the touch screen; and perform an operation corresponding to the first touch operation in response to determining the first touch operation information corresponding to the first motion sensing action.

The first application may be, for example, a game application.

In a possible implementation, the performing an operation corresponding to the first touch operation specifically includes: controlling the touch screen to display a second picture of the first application, where the second picture is the same as a picture displayed by the electronic device in response to that the user performs the first touch operation on the first picture.

In a possible implementation, the determining first touch operation information corresponding to the first motion sensing action specifically includes: calling an interface of an application framework layer of the electronic device, and determining the first touch operation information corresponding to the first motion sensing action.

In a possible implementation, the at least one processor is further configured to: receive an operation in which the user enables a first function; and enable the first function in response to the operation in which the user enables the first function, where the first function is a function of which the first application supports the user controlling the first application through a motion sensing action.

In a possible implementation, the at least one processor is further configured to add a layer to a picture of the first application, where the layer includes a non-transparent region and a transparent region, and the non-transparent region displays a setting interface of the first function.

In a possible implementation, the at least one processor is further configured to receive an operation in which the user sets a correspondence between a motion sensing action and a touch operation by using the setting interface of the first function, where the touch operation includes a type of the touch operation and a position at which the touch operation is performed on the touch screen.

In a possible implementation, the type of the touch operation includes at least one of the following: a tap operation, a slide operation, a double-tap operation, a touch and hold operation, a finger joint knock operation, a multi-point touch operation, and a predefined gesture.

In a possible implementation, the at least one processor is further configured to store the setting of the user for the correspondence between the motion sensing action and the touch operation; and add a second layer to the picture of the first application, where the second layer includes a non-transparent region and a transparent region, and the non-transparent region displays a preview window of the at least one camera.

In a possible implementation, the at least one camera includes a depth camera.

In a possible implementation, the at least one processor is further configured to enable a screen mirroring function, and instruct another electronic device that is connected to the electronic device and that has a screen to display a picture of the electronic device.

According to a third aspect, a computer storage medium is provided, including computer instructions, where the computer instructions, when run on a terminal, cause the terminal to perform the method according to the first aspect and any one of the possible implementations thereof.

According to a fourth aspect, a computer program product is provided, where the computer program product, when run on a computer, causes the computer to perform the method according to the first aspect and any one of the possible implementations thereof.

According to a fifth aspect, a circuit system is provided, including at least one processor, where when the at least one processor executes instructions, the at least one processor performs the method according to the first aspect and any one of the possible implementations thereof.

DESCRIPTION OF EMBODIMENTS

In the descriptions of the embodiments of this application, unless otherwise stated, "/" represents an OR meaning, for example, A/B may represent A or B; and "and/or" in this specification is merely an association relationship for describing associated objects and represents that three relationships may exist. For example, A and/or B may represent the following three cases: only A exists, both A and B exist, and only B exists.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In the description of the embodiments of this application, unless otherwise stated, "a plurality of" means two or more.

In the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a related concept in a specific manner.

For example, the electronic device in this application may be a mobile phone, a tablet computer, a personal computer (PC), a personal digital assistant (PDA), a smartwatch, a netbook, a wearable electronic device, or an augmented reality (AR) device, a virtual reality (VR) device, an in-vehicle device, a smart car, a smart speaker, a robot, or the like. A specific form of the electronic device is not specially limited in this application.

Figure 1:
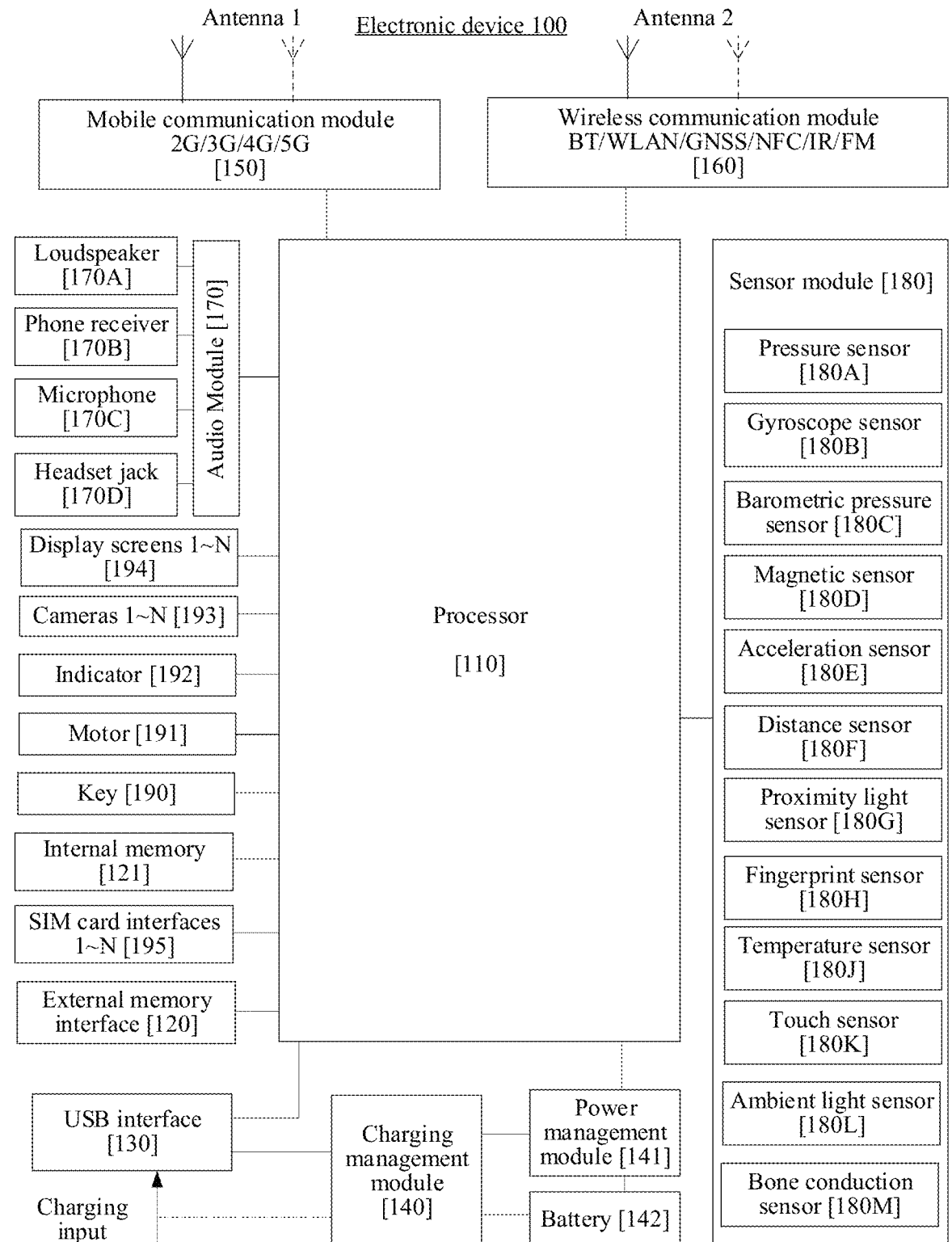
FIG. 1 is a schematic structural diagram 1 of an electronic device according to an embodiment of this application.

FIG. 1 is a schematic structural diagram of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present disclosure does not constitute a specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operating control signal according to an instruction operation code and a sequence signal, to complete control of fetching and executing instructions.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments of this application, the processor 110 may analyze an image captured by the camera 193, to determine a motion sensing action of a user, and determine whether the motion sensing action of the user is a predefined motion sensing action. Subsequently, a touch operation in a target game corresponding to the predefined motion sensing action is found, and an instruction of the corresponding touch operation is sent to a target game application, so that the target game application performs a corresponding response, to achieve an effect that the user controls the target game by using the motion sensing action.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using the UART interface, to implement a function of playing music by using a Bluetooth headset.

The MIPI interface may be configured to connect the processor 110 to peripheral devices such as the display screen 194 and the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display screen 194 by using a DSI interface, to implement a display function of the electronic device 100.

The GPIO interface may be configured by using software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, or the like. The GPIO interface may also be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

It may be understood that an interface connection relationship between the modules illustrated in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from a charger. The charger may be a wireless charger or may be a wired charger. In some embodiments of wired charging, the charging management module 140 may receive charging input of a wired charger by using the USB interface 130. In some embodiments of wireless charging, the charging management module 140 may receive wireless charging input by using a wireless charging coil of the electronic device 100. The charging management module 140 may supply power for the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the loudspeaker 170A, the telephone receiver 170B, and the like), or displays an image or a video through the display screen 194. In some embodiments, the modem processor may be an independent device. In some other embodiments, the modem processor may be independent of the processor 110, and the modem processor and the mobile communications module 150 or another function module may be disposed in a same component.

The wireless communication module 160 may provide a solution to wireless communication solution including a wireless local area network (WLAN) (such as a wireless fidelity (Wi-Fi) network), Bluetooth (BT), and a global navigation satellite system (GNSS), frequency modulation (FM), a near field communication (NFC) technology, an infrared (IR) technology, and the like to be applied to the electronic device 100. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs and execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, quantum dot light emitting diodes (QLED), and the like. In some embodiments, the electronic device 100 may include one or N display screens 194, N being a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on noise points, brightness, and skin tone. The ISP may also optimize parameters such as exposure and color temperature of a shooting scene. In some embodiments, the ISP may be disposed in the camera 193.

The camera 193 is configured to capture a static image or a video. An optical image of an object is generated through a lens and is projected to the photosensitive element. The light-sensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in standard RGB and YUV formats. In some embodiments, the electronic device 100 may include one or N cameras 193, N being a positive integer greater than 1.

In the embodiments of this application, when a target game is run on a mobile phone, the camera 193 can be called to capture an image of a user, so that the processor 110 analyzes a captured image, to determine a motion sensing action of the user.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

The NPU is a neural-network (NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

In some embodiments of this application, the NPU may analyze the image captured by the camera 193, and may determine a portrait in the image by using, for example, a portrait recognition technology. Subsequently, positions of joints such as elbow joints, wrist joints, and knee joints in the portrait are determined by using a bone recognition technology (a process of estimating positions of human body joint points in an image or a video by using a computer vision technology), and the positioned joint points finally can form a human body bone image, which can reflect information about a current posture (that is, a motion sensing action) of the human body or the like.

The external memory interface 120 may be configured to connect to an external storage card such as a micro SD card, to expand a storage capability of the electronic device 100. The external storage card communicates with the processor 110 by using the external memory interface 120, so as to implement a data storage function, such as storing a file such as music or a video in the external storage card.

The internal memory 121 may be configured to store computer executable program code, and the executable program code includes an instruction. The internal memory 121 may include a program storage region and a data storage region. The program storage region may store an operating system, an application required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (UFS). The processor 110 runs the instructions stored in the internal memory 121 and/or the instructions stored in the memory disposed in the processor, to perform various function applications and data processing of the electronic device 100.

The electronic device 100 may implement an audio function, for example, music playing and recording, by using the audio module 170, the loudspeaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The loudspeaker 170A, also referred to as a "speaker", is configured to convert an audio electrical signal into a sound signal. Music can be listened to or a hands-free call can be answered by using the speaker 170A in the electronic device 100.

The telephone receiver 170B, also referred to as a "receiver", is configured to convert an audio electrical signal into a sound signal. When the electronic device 100 is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may speak with the mouth approaching the microphone 170C, to input a sound signal into the microphone 170C. At least one microphone 170C may be disposed in the electronic device 100. In some other embodiments, two microphones 170C may be disposed in the electronic device 100, to acquire a sound signal and implement a noise reduction function. In some other embodiments, three, four, or more microphones 170C may be alternatively disposed in the electronic device 100, to acquire a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a position of the touch based on a detection signal of the pressure sensor 180A. In some embodiments, the touch operations that are performed at a same touch position but have different touch operation strength may correspond to different operation instructions. For example, when a touch operation whose touch operation strength is less than a first pressure threshold is performed on a short message application icon, an instruction of checking a short message is executed. When a touch operation whose touch operation strength is greater than or equal to the first pressure threshold is performed on the short message application icon, an instruction of creating a new short message is executed.

The gyroscope sensor 180B may be configured to determine a motion posture of the electronic device 100. In some embodiments, an angular velocity of the electronic device 100 around three axes (namely, x, y, and z axes) may be determined by using the gyroscope sensor 180B. The gyroscope sensor 180B may be used for image stabilization during photographing. For example, when a shutter is pressed, the gyroscope sensor 180B detects an angle at which the electronic device 100 jitters, and calculates, based on the angle, a distance for which a lens module needs to compensate, and allows the lens to cancel a jitter of the electronic device 100 through a reverse motion, thereby implementing image stabilization. The gyroscope sensor 180B may also be used in navigation and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect an opening state or a closing state of a flip leather case by using the magnetic sensor 180D. In some embodiments, when the electronic device 100 is a clamshell phone, the electronic device 100 may detect an opening state or a closing state of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect an acceleration value of the electronic device 100 in all directions (generally in three axes). When the electronic device 100 is stationary, a magnitude and a direction of gravity may be detected. The acceleration sensor may be further configured to recognize a posture of the electronic device, and be applied to switching between landscape orientation and portrait orientation, a pedometer, or another application.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The electronic device 100 may emit infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that a user holds the electronic device 100 close to an ear for a call, so that automatic screen-off is implemented to save power. The optical proximity sensor 180G may alternatively be used in a leather case mode or a pocket mode to automatically unlock or lock a screen.

The ambient light sensor 180L is configured to sense ambient light brightness. The electronic device 100 may adaptively adjust a luminance of the display screen 194 according to perceived ambient light brightness. The ambient light sensor 180L may be further configured to automatically adjust white balance during photo taking. The ambient light sensor 180L may further cooperate with the optical proximity sensor 180G to detect whether the electronic device 100 is in a pocket, so as to prevent an accidental touch.

The fingerprint sensor 180H is configured to acquire a fingerprint. The electronic device 100 may implement fingerprint unlock, application lock accessing, fingerprint photographing, fingerprint-based call answering, and the like by using a feature of the acquired fingerprint.

The temperature sensor 180J is configured to detect temperature. In some embodiments, the electronic device 100 executes a temperature processing policy by using the temperature detected by the temperature sensor 180J. For example, when a temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to prevent low temperature from causing the electronic device 100 to shut down abnormally. In some other embodiments, when the temperature is lower than still another threshold, the electronic device 100 boosts an output voltage of the battery 142 to prevent abnormal shutdown caused by low temperature.

The touch sensor 180K is also referred to as a "touch device". The touch sensor 180K may be disposed on the display screen 194. The touch sensor 180K and the display screen 194 form a touch screen. The touch sensor 180K is configured to detect a touch operation performed on or near the touch sensor. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the electronic device 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may obtain a voice signal through parsing based on the vibration signal that is of the vibration bone of the vocal-cord part and obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or may be a touch-type key. The electronic device 100 may receive a key input, and generate a key signal input related to user setting and function control of the electronic device 100.

The motor 191 may generate a vibration prompt. The motor 191 may be configured to provide a vibration prompt for an incoming call, and may be further configured to provide touch vibration feedback. For example, touch operations performed on different applications (for example, photo taking and audio playing) may correspond to different vibration feedback effects. For touch operations performed in different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces, N being a positive integer greater than 1. The SIM card interface 195 can support a nano SIM card, a micro SIM card, a SIM card, and the like. A plurality of cards may all be inserted into the same SIM card interface 195. The plurality of cards may be of a same type or different types. The SIM card interface 195 may further be compatible with different types of SIM cards. The SIM card interface 195 may also be compatible with an external memory card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event-driven architecture, a microkernel architecture, a micro service architecture, or a cloud architecture. In this embodiment of the present disclosure, an Android system with a layered architecture is used as an example to illustrate a software structure of the electronic device 100.

Figure 2:
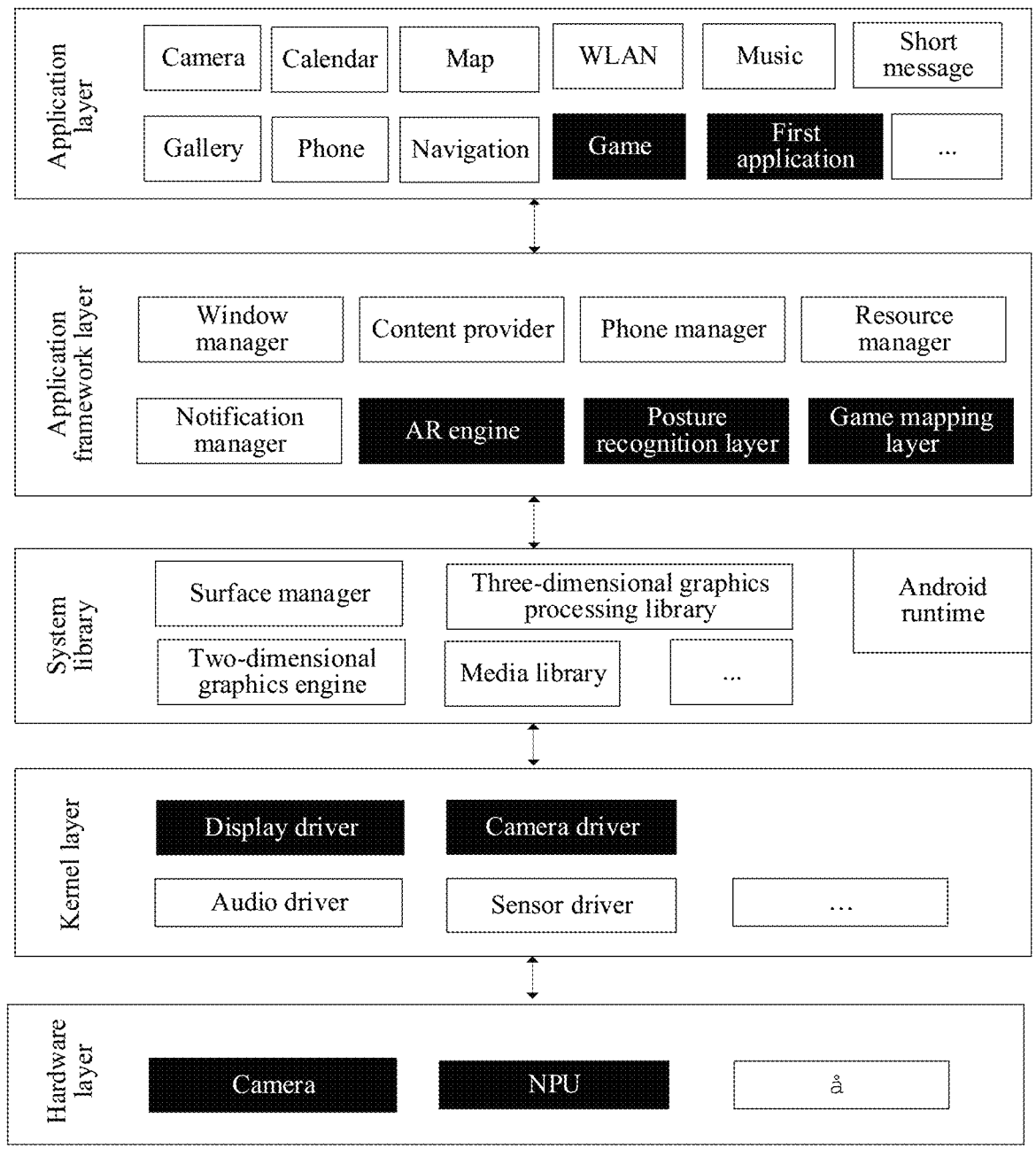
FIG. 2 is a schematic structural diagram 2 of an electronic device according to an embodiment of this application.

FIG. 2 is a block diagram of a software structure of an electronic device 100 according to an embodiment of the present disclosure.

In the layered architecture, software is divided into several layers, and each layer has a clear role and task. Layers communicate with each other through a software interface. In some embodiments, the Android system is divided into four layers that are respectively an application layer, an application framework layer, an Android runtime and system library, and a kernel layer from top to bottom.

The application layer may include a series of application packages.

As shown in FIG. 2, the application packages may include applications such as camera, gallery, calendar, phone, map, navigation, WLAN, Bluetooth, music, video, and short message.

In some embodiments of this application, the application packages further include game applications such as Parkour games, music type games, and dance type games. It should be noted that, the game application herein may not support a motion sensing gameplay.

The application packages may further include a first application such as a game assistant or an application assistant. The user may select, by using an interface provided by the first application, a game application such as Subway Parkour to be played with the motion sensing gameplay, to enable a function of the motion sensing gameplay or the like.

The application framework layer provides an application programming interface (API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including a short message notification icon may include a view for displaying text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flash.

In some embodiments of this application, the application framework layer further includes an AR engine, a posture recognition layer, and a game mapping layer. The AR engine layer is configured to analyze an image of a user captured by a camera, including performing bone point recognition on the image of the user, converting the image of the user into bone motion coordinates combined by points and lines, and the like.

The posture recognition layer is configured to recognize the converted bone motion coordinates and determine motion sensing actions such as body left-leaning/right-leaning/front-leaning/back-leaning, jumping up, crouching, lifting a left arm upward/downward/leftward/forward/backward, lifting a left arm upward/downward/leftward//forward/backward, lifting a left leg forward/leftward, and lifting a right leg forward/rightward of the user.

The game mapping layer is configured to perform mapping on a predefined motion sensing action and a touch operation of a game application. When a user plays a game, and after a motion sensing action of the user is detected, if the motion sensing action is a predefined motion sensing action, a touch operation in a game application corresponding to the predefined motion sensing action is determined, and an instruction of the corresponding touch operation is sent to a game application, so that the game application may perform a response corresponding to the touch operation, that is, achieve an effect of controlling the game application by using the motion sensing action.

The Android Runtime includes a kernel library and a virtual machine. The Android runtime is responsible for scheduling and managing the Android system.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem, and converge 2D and 3D layers of a plurality of applications.

The media library supports playback and recording in a plurality of common audio and video formats, and also support static image files, and the like. The media library may support a plurality of audio and video encoding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawings.

The kernel layer is a layer between hardware and software. The kernel layer includes at least a display driver, a camera driver, an audio driver, and a sensor driver.

In some embodiments of this application, the first application may call, by using a camera driver, a camera in a hardware layer to capture an image of a user during playing of a game, so that the AR engine and the posture recognition layer of the application framework layer analyze a captured image of the user and determine a motion sensing action performed by the user, and the like. When the AR engine analyzes the captured image of the user and the posture recognition layer performs posture recognition, an AI processing chip in the hardware layer may also be called. For example, the NPU performs data processing such as bone point recognition or posture recognition.

All technical solutions included in the following embodiments can be implemented in the electronic device 100 having the foregoing hardware architecture and software architecture. The following describes the technical solution provided in the embodiments of this application in detail by using an example in which the electronic device 100 is a mobile phone.

Currently, a user may conveniently install various game applications such as Parkour games (for example, Subway Parkour) and music type games (for example, Dance Mission) on a mobile phone. To further improve a fun level of a game, an embodiment of this application provides a method for allowing a common game (which refers to a game that does not support a motion sensing gameplay originally) on a mobile phone to support the motion sensing gameplay, so that the user may control a game by using a motion sensing action, to achieve an integrated effect of entertainment and fitness, thereby meeting diversified requirements of the user.

In some embodiments of this application, during running of a target game, a first application such as a game assistant is run, and the first application calls a camera of the mobile phone by using a camera driver in a kernel layer to capture an image of the user. Subsequently, the mobile phone analyzes the captured image of the user and recognizes a motion sensing action performed by the user. If the motion sensing action performed by the user is a predefined motion sensing action, an instruction of a touch operation of the target game corresponding to the predefined motion sensing action is sent to the target game, so that the target game may perform a corresponding response, to allow the target game that does not support the motion sensing gameplay originally to also respond to the motion sensing action performed by the user. In this way, native code of the target game may not be modified, that is, the target game can support the motion sensing gameplay.

In other words, a function of which the target game supports the motion sensing gameplay can be implemented by using another application (for example, the first application) or a system function of the mobile phone without changing the target game. It can be seen that the game running method provided in this embodiment is applicable to games that support a touch operation, that is, a version of supporting a motion sensing gameplay does not need to be developed separately for each first application, which is beneficial to reducing development costs.

It may be understood that, in addition to the game application, the method provided in this embodiment of this application is also applicable to another application, installed on the mobile phone, that may support a touch operation for controlling. The following describes the technical method provided in the embodiments of this application in detail by using a game application as an example.

Referring to FIG. 3A to FIG. 3C, FIG. 4A to FIG. 4C, and FIG. 5A to FIG. 5I, descriptions are made below with reference to schematic diagrams of graphical user interfaces.

First, the mobile phone enables a function of a motion sensing gameplay of a target game.

In some embodiments, a user may enable the function of the motion sensing gameplay of the target game by using a first application (for example, a game assistant or an application assistant).

Figure 3A:
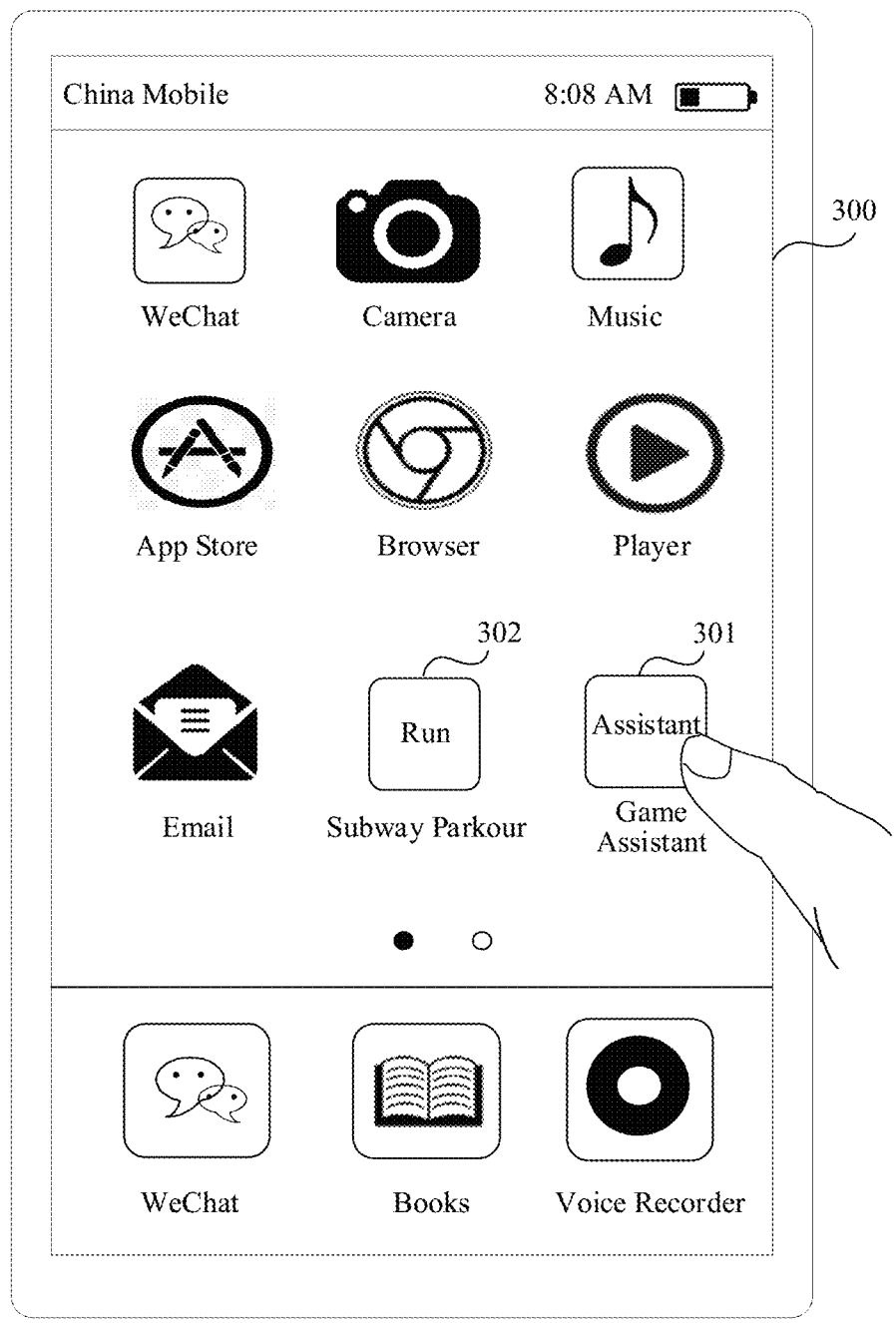
FIG. 3A is a schematic diagram of some user interfaces of an electronic device according to an embodiment of this application.

For example, an interface 300 shown in FIG. 3A is a schematic diagram of a desktop of the mobile phone. The interface 300 may include a status bar, one or more icons of applications such as an icon 301 of a game assistant and an icon 302 of the target game (for example, Subway Parkour), and a dock bar. The status bar may include an operator name, time, a battery level condition, a network connection status, and the like. The dock bar may include a plurality of shortcut application icons.

Figure 3B:
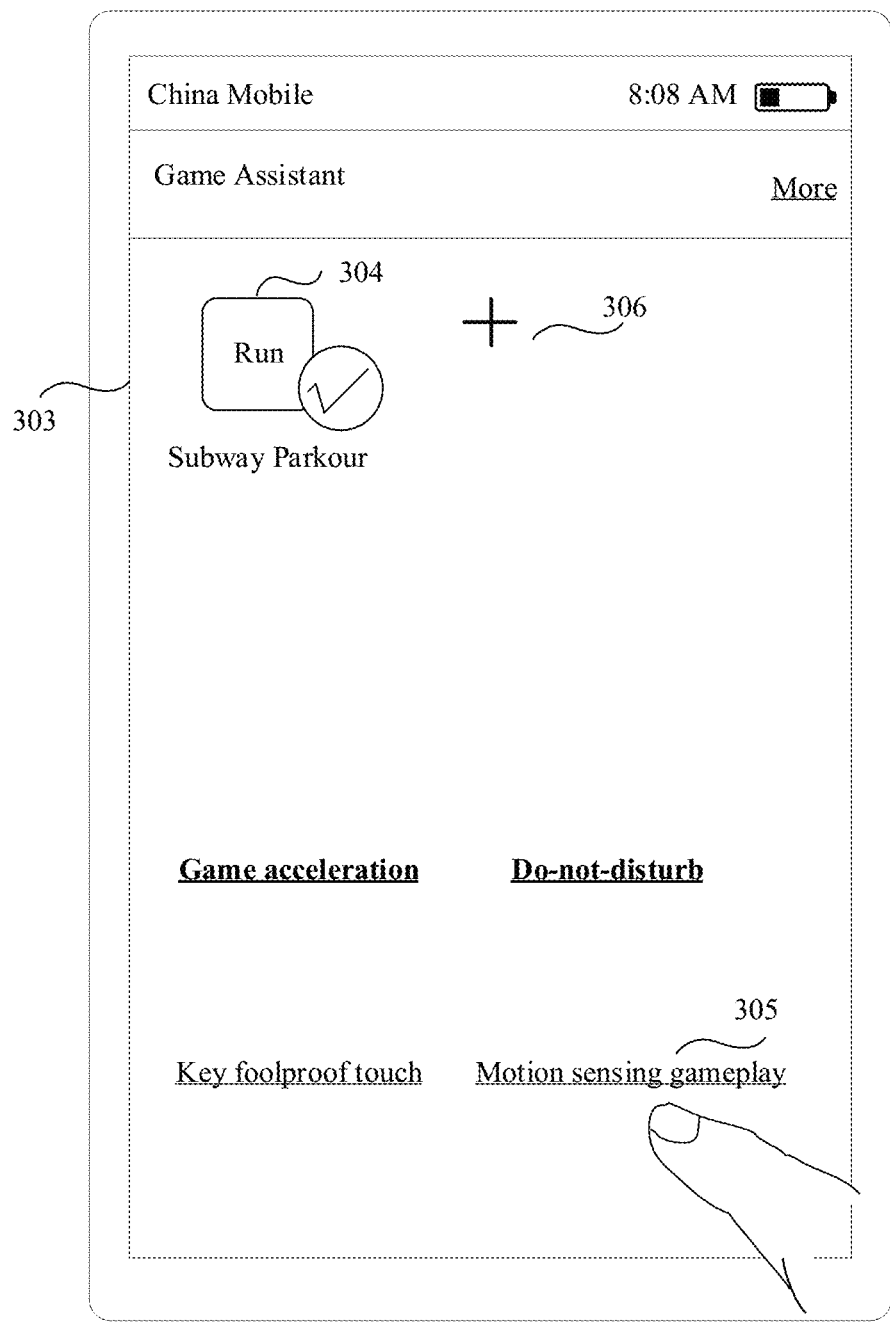
FIG. 3B is a schematic diagram of still some user interfaces of an electronic device according to an embodiment of this application.
Figure 3C:
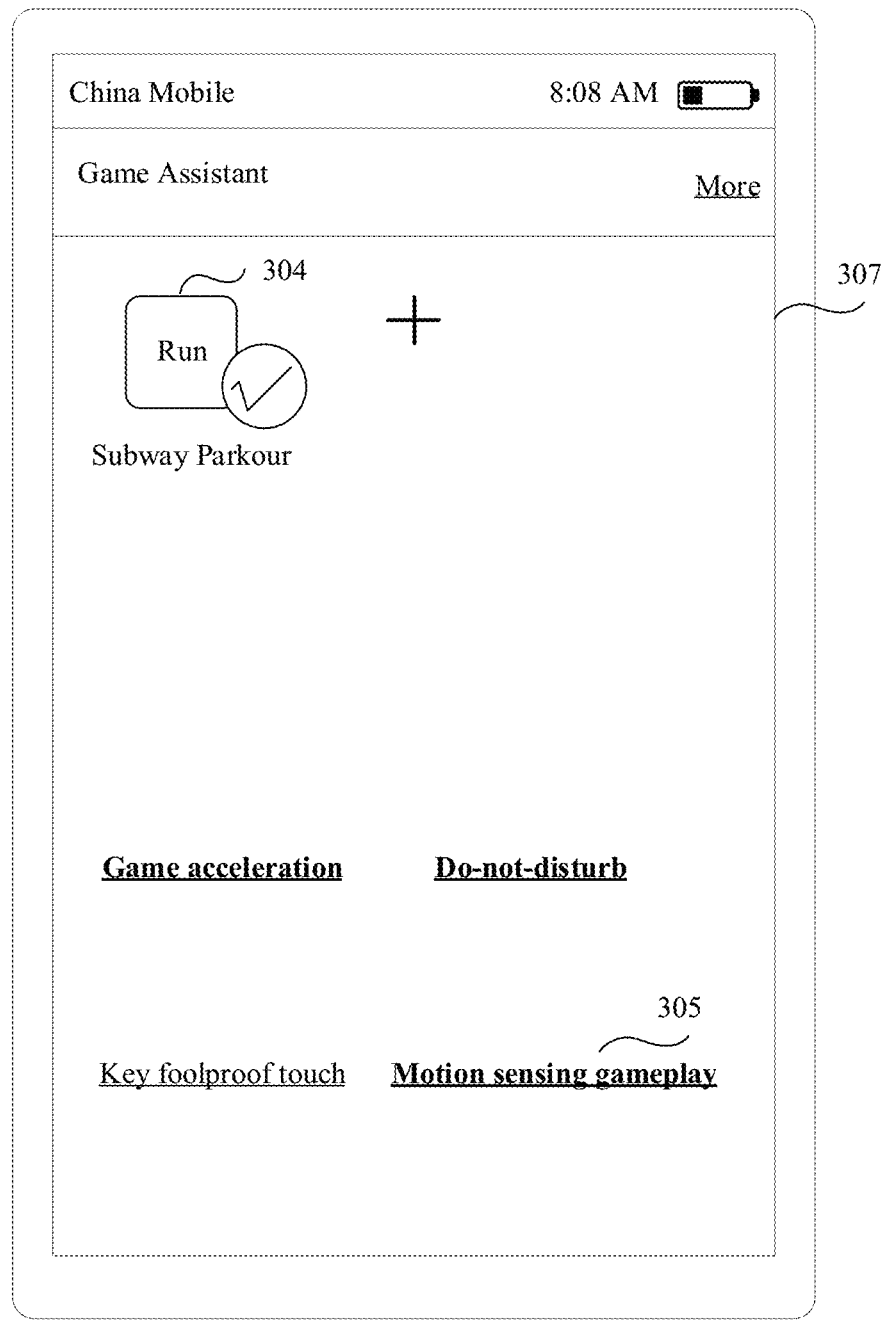
FIG. 3C is a schematic diagram of still some user interfaces of an electronic device according to an embodiment of this application.

When a user wants to play a game by using a motion sensing gameplay, the user may enter an interface of a game assistant by tapping the icon 301 of the game assistant and enable a function of a motion sensing gameplay of a target game. For example, as shown in FIG. 3B, the target game such as Subway Parkour of which the motion sensing gameplay is to be enabled is selected in the interface 303 of the game assistant. Subsequently a function control 305 of the motion sensing gameplay is tapped to enable the function of the motion sensing gameplay of the Subway Parkour. In this case, in an interface 307 shown in FIG. 3C, functions of game acceleration, do-not-disturb, and the motion sensing gameplay are enabled in the Subway Parkour. For the functions of the game acceleration and the do-not-disturb, reference may be made to the prior art, and details are not described herein again. The following describes the function of the motion sensing gameplay and specific implementation of the function of the motion sensing gameplay in detail.

If there is no target game in the game assistant, the target game may be alternatively added to the game assistant by using an adding control 306 in the interface 303 of the game assistant, and the motion sensing gameplay of the target game is then enabled.

In some other embodiments, the user may enable the function of the motion sensing gameplay through system setting. The function of the motion sensing gameplay may be an independent function in the system setting or may be a sub-function of the game assistant or the like. This is not limited in this embodiment of this application.

Figure 4A:
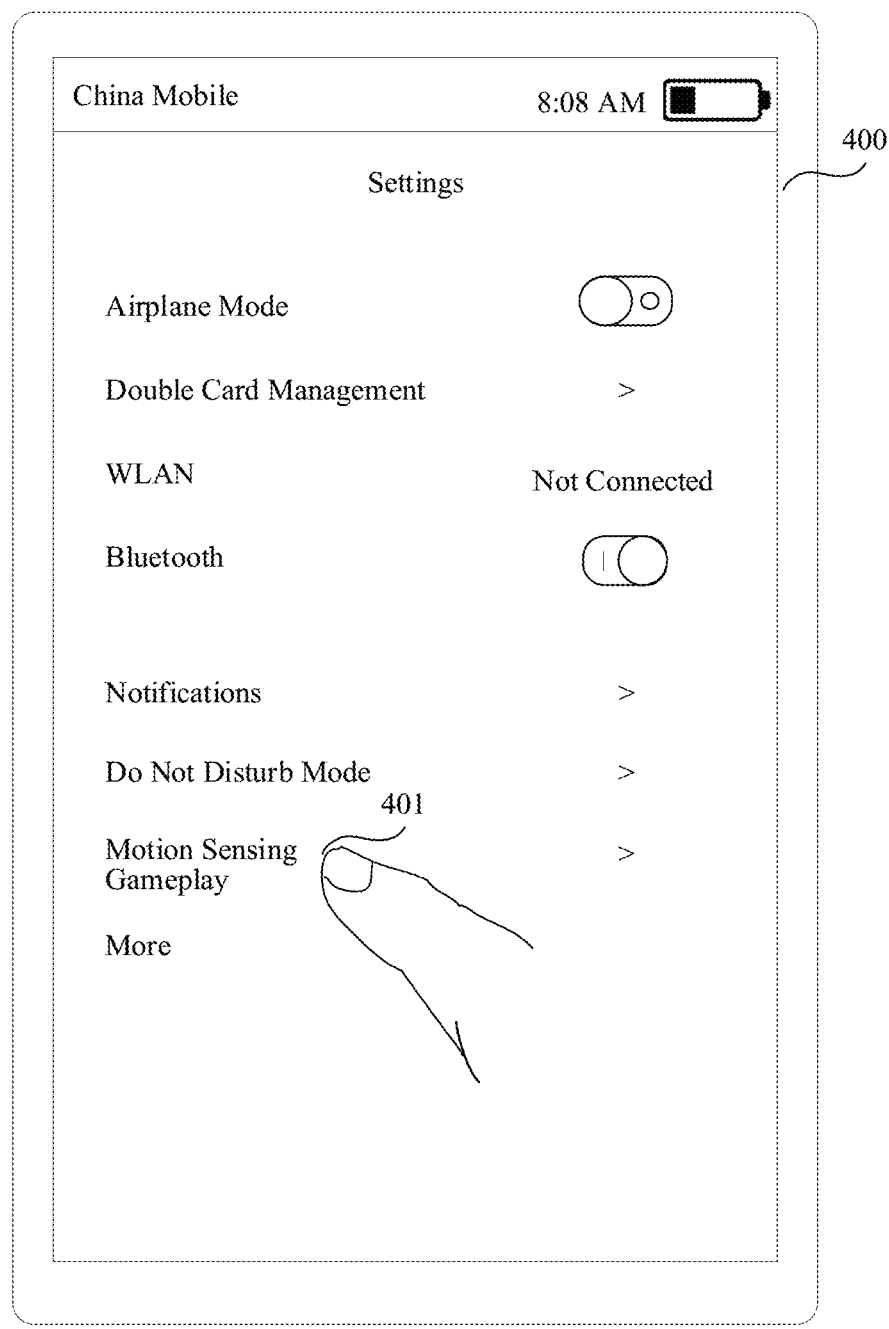
FIG. 4A is a schematic diagram of still some user interfaces of an electronic device according to an embodiment of this application.
Figure 4B:
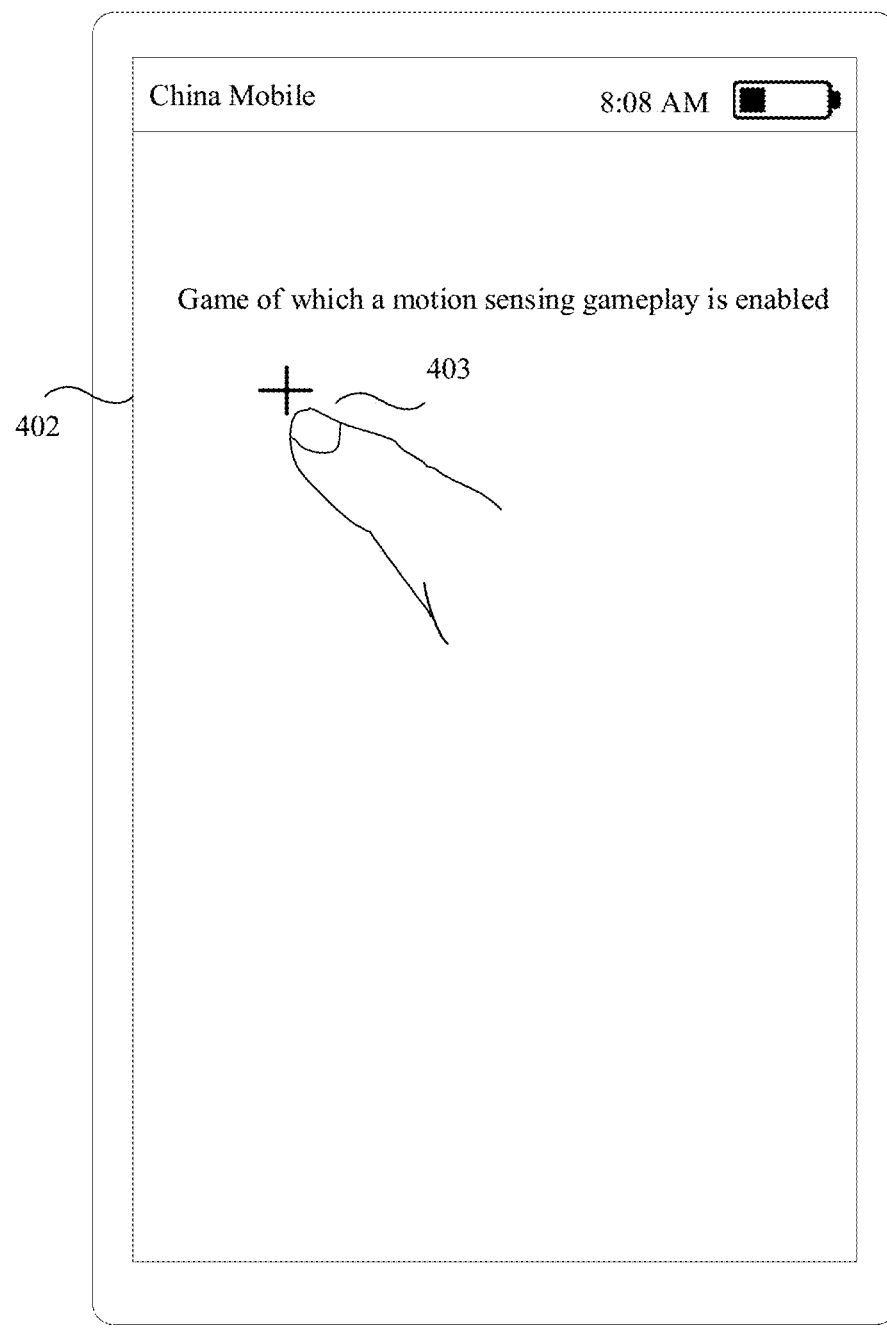
FIG. 4B is a schematic diagram of still some user interfaces of an electronic device according to an embodiment of this application.
Figure 4C:
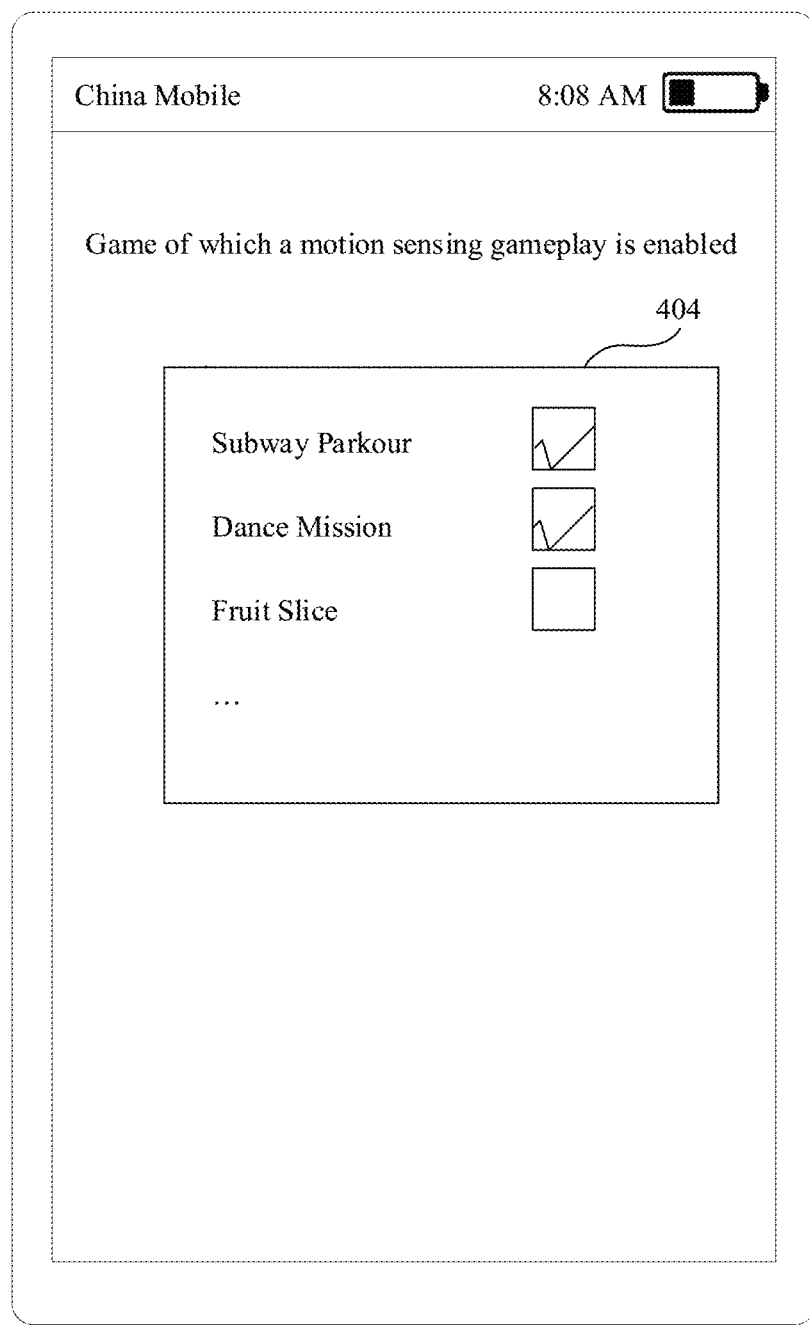
FIG. 4C is a schematic diagram of still some user interfaces of an electronic device according to an embodiment of this application.

For example, a setting interface 400 shown in FIG. 4A is an example of a mobile phone system setting interface. The setting interface 400 includes a function item 401 of the motion sensing gameplay. In response to that the user taps the function item 401 of the motion sensing gameplay, the mobile phone displays an interface 402 shown in FIG. 4B. As shown in FIG. 4C, in response to that the user taps an adding control 403, a selection box 404 pops up on the mobile phone, and the user may add, by using the selection box 404, a game of which a function of a motion sensing gameplay needs to be enabled.

In still some embodiments, during running of the target game, the user may alternatively enable the function of the motion sensing gameplay of the target game by inputting a speech command or performing a predefined gesture such as three fingers sliding downward or another manner. In other words, a manner in which the mobile phone enables the motion sensing gameplay is not specifically limited in this application.

After the motion sensing gameplay of the target game is enabled, some motion sensing actions need to be further predefined, and a correspondence between the predefined motion sensing actions and touch operations in the target game is set.

The touch operations refer to operations such as tapping, double-tapping, touch and hold, sliding, and drawing a specific pattern that are allowed to be performed by the user in the target game through a touch screen.

Specifically, the user may open the target game by using an icon of the target game on a mobile phone desktop, or may open the target game by using some other shortcuts.

Figure 5A:
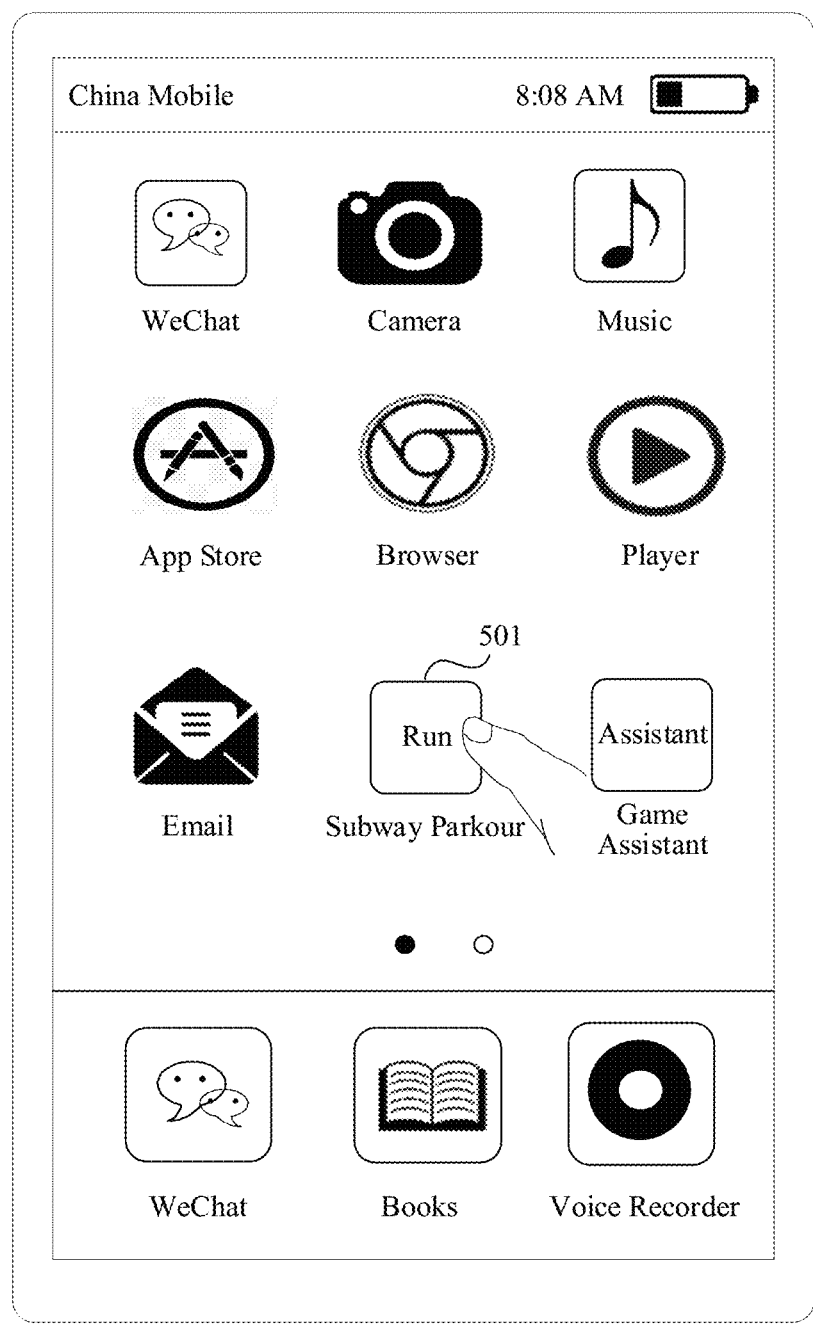
FIG. 5A is a schematic diagram of still some user interfaces of an electronic device according to an embodiment of this application.
Figure 5B:
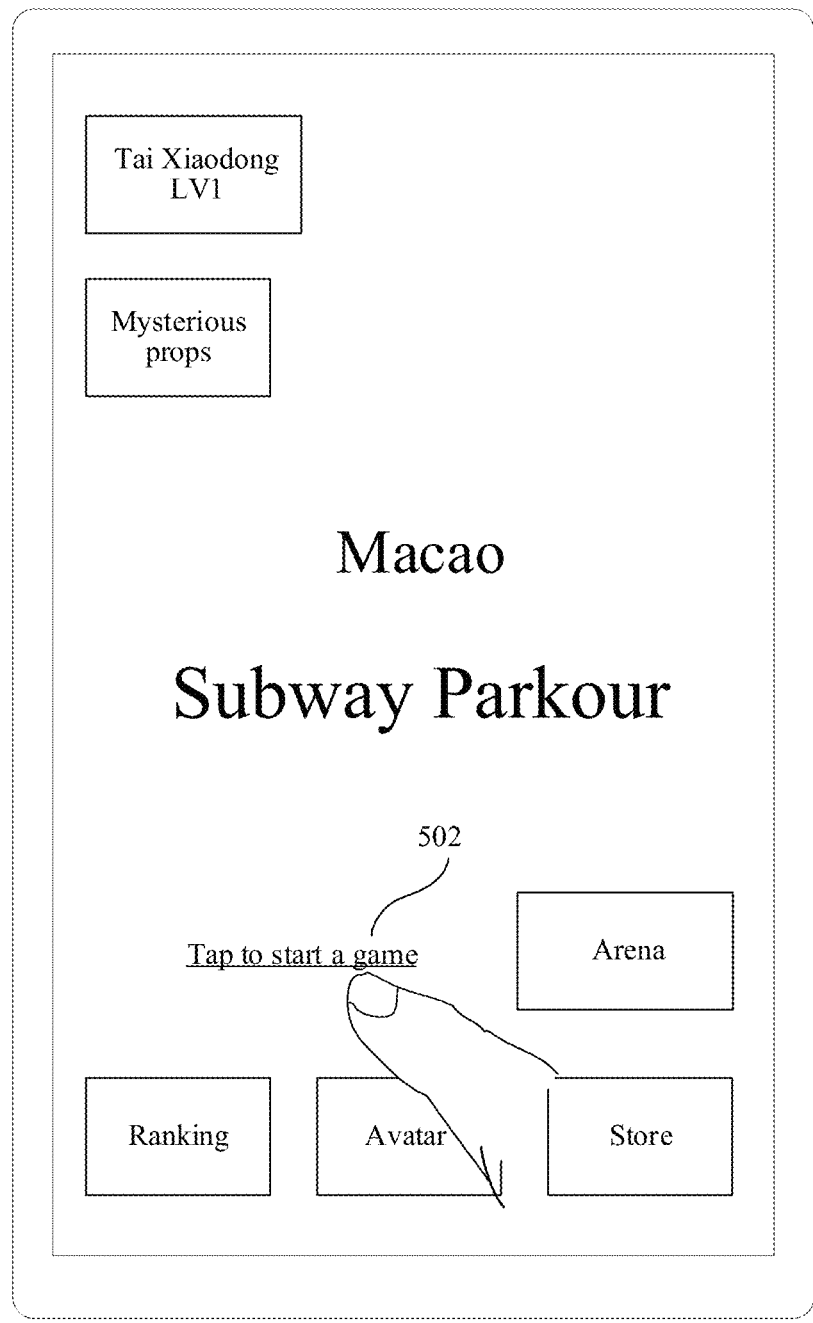
FIG. 5B is a schematic diagram of still some user interfaces of an electronic device according to an embodiment of this application.
Figure 5C:
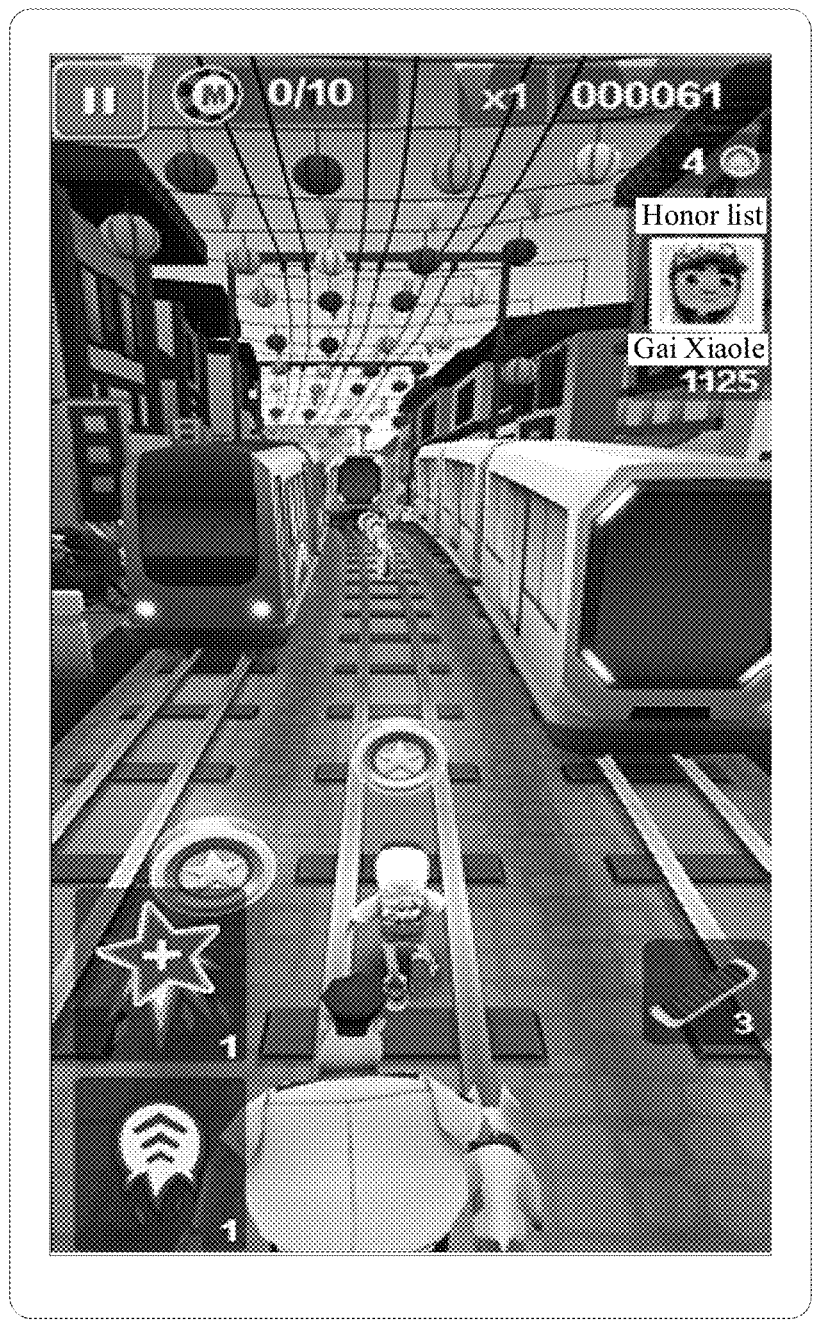
FIG. 5C is a schematic diagram of still some user interfaces of an electronic device according to an embodiment of this application.

For example, in response to that the user taps an icon 501 of a target game (for example, Subway Parkour) on a mobile phone desktop shown in FIG. 5A, the mobile phone starts the target game and displays a starting interface of the target game shown in FIG. 5B. In response to that the user taps a control 502 of "tap to start a game" on the starting interface of the target game, the target game is run on the mobile phone, that is, an interface shown in FIG. 5C is displayed.

Figure 5D:
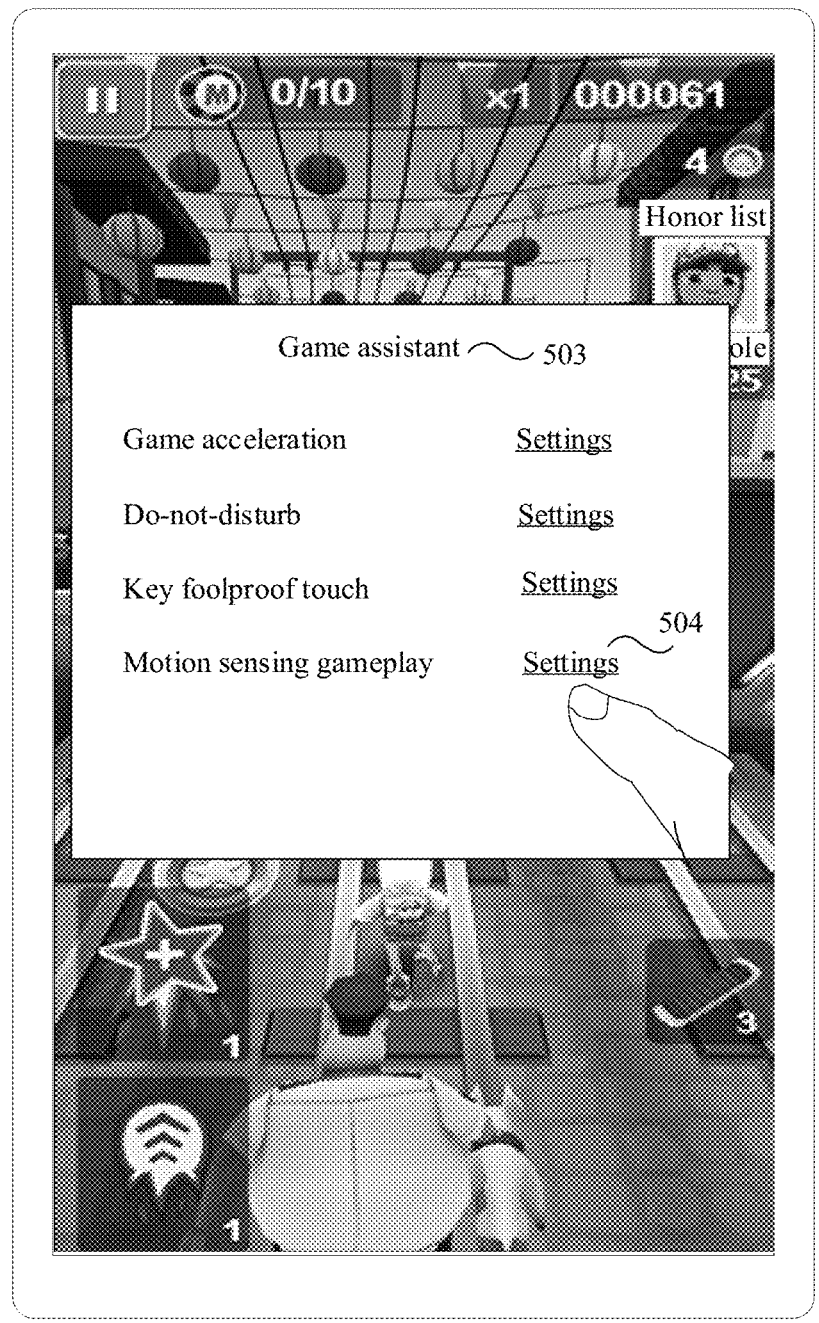
FIG. 5D is a schematic diagram of still some user interfaces of an electronic device according to an embodiment of this application.

In some embodiments, as shown in FIG. 5D, after the mobile phone starts the game, a dialog box 503 of a game assistant may automatically pop up or may pop up in response to an operation (for example, a predefined gesture is performed or a speech instruction is inputted for operating a specific control) of the user on the mobile phone. The user may set related functions of the game assistant by using the dialog box 503. For example, game acceleration, do-not-disturb, key foolproof touch, and motion sensing gameplay are set. In some other embodiments, alternatively, after the mobile phone enters the target game, but does not start the game, a dialog box 503 of a game assistant may automatically pop up or may pop up in response to an operation of the user on the mobile phone.

The dialog box 503 may be displayed on a game interface in a partially transparent or non-transparent manner. That is, the dialog box 503 may block a part of the game interface. The dialog box 503 may be alternatively displayed in a manner that does not block the game interface. For example, the dialog box is displayed on the left, the right, the top, or the bottom of the game interface. The dialog box 503 and the game interface are displayed on the screen without blocking each other. It should be noted that, a display moment, a display manner, a display position, and the like of the dialog box 503 are not specifically limited in this embodiment of this application.

In a specific implementation, after detecting that a user starts a target game application (or detecting that a specific interface of a target game application is displayed on the mobile phone), the mobile phone may add a layer of a game assistant to a game interface of the target game application by using a window manager of an application framework layer or another system service. The layer of the game assistant is located on a layer of the game interface of the target game application and includes the dialog box 503 of the game assistant, and in addition to the dialog box 503, other regions on the layer are transparent. In this way, the user may see the game interface of the target game application and the dialog box 503 simultaneously, and the user may operate a control on the dialog box 503. It can be seen that in this implementation, the mobile phone adds a setting interface for a predefined motion sensing action to the target game application without modifying the original target game application.

In another specific implementation, after detecting that a user starts a target game application or detecting that a specific interface of a target game application is displayed on the mobile phone), the mobile phone may alternatively adjust a size and a position of a game interface of the target game application by using a window manager of an application framework layer or another system service. For example, the game interface of the target game application is scaled down to leave a display region with a specific size on the left of the mobile phone. In addition, a setting interface for prompting the user to set the predefined motion sensing action is displayed on the display region. It can be seen that in this implementation, the mobile phone adds the setting interface for the predefined motion sensing action to the target game application without modifying the original target game application.

Figure 5E:
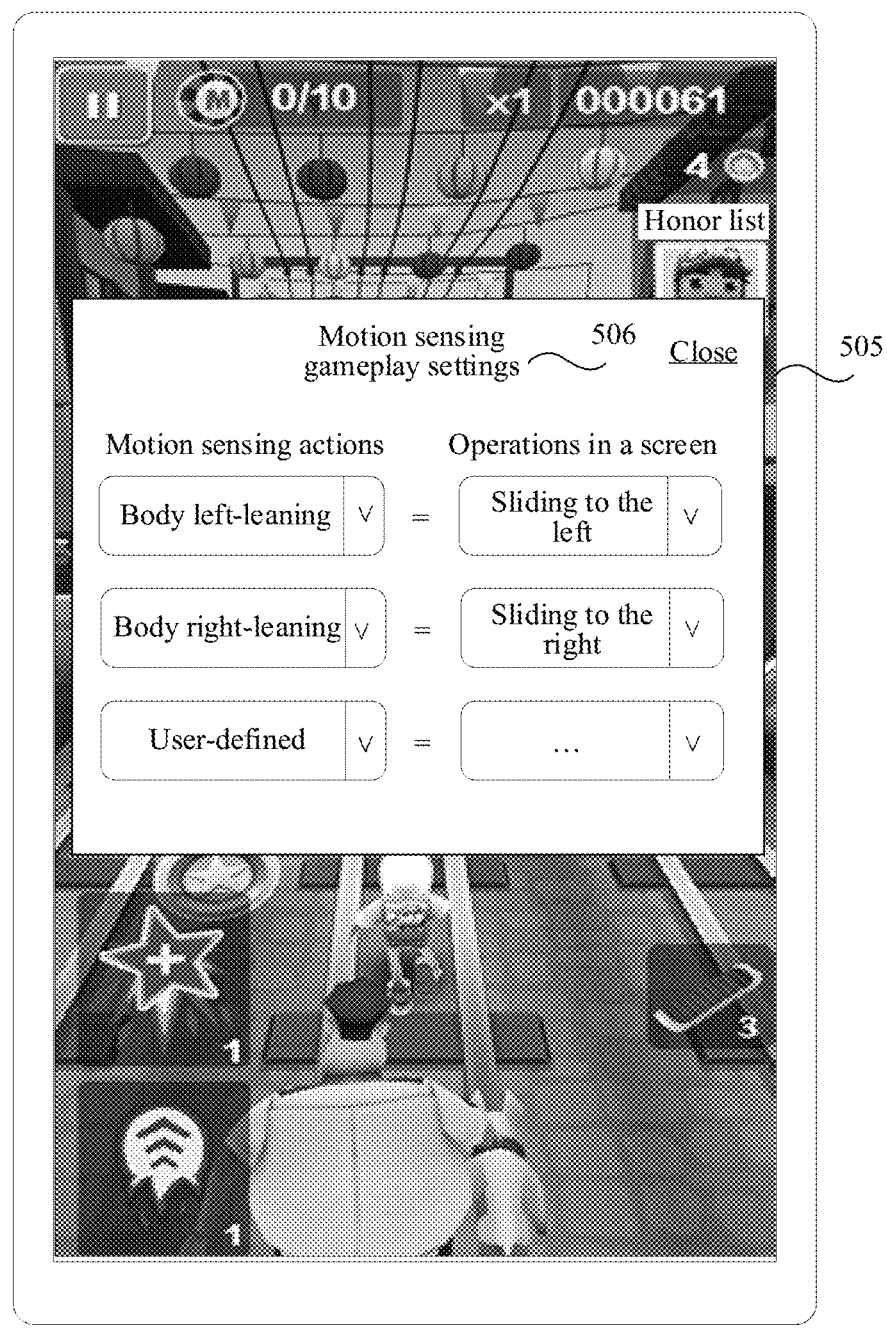
FIG. 5E is a schematic diagram of still some user interfaces of an electronic device according to an embodiment of this application.

Then, in response to a tap operation of the user on a setting control 504 corresponding to a function of a motion sensing gameplay shown in FIG. 5D, the mobile phone displays an interface 505 shown in FIG. 5E, and a specific setting item 506 for the function of the motion sensing gameplay is displayed on the interface 505. For example, the user may select a predefined motion sensing action by using the following menu and set a corresponding touch operation for the selected predefined motion sensing action.

In addition, when selecting the predefined motion sensing action, the user may alternatively select an image including the predefined motion sensing action. Therefore, the mobile phone recognizes the image selected by the user, and sets a recognized motion sensing action as the predefined motion sensing action, that is, customizes some predefined motion sensing actions. The image including the predefined motion sensing action may be a picture in a mobile phone album, or may be a picture downloaded from the Internet by the mobile phone, or may be a picture, including a portrait, that is captured by a camera currently called by the mobile phone. A method for the mobile phone to recognize the predefined motion sensing action in the image is described in detail below, and details are not described herein again.

Table 1 is an example of a correspondence between set predefined motion sensing actions and touch operations in a target game.

TABLE 1

| Predefined motion sensing actions | Touch operations in a target game |
|---|---|
| Body left-leaning | Sliding to the left on a screen |
| Body right-leaning | Sliding to the right on the screen |
| Crouching | Sliding downward on the screen |
| Jumping up | Sliding upward on the screen |
| Continuously jumping twice | Double-tapping on the screen |
| . . . | . . . |

It should be noted that, in this application, when the mobile phone detects that a motion sensing action of a user is a predefined motion sensing action, the mobile phone needs to send an instruction of a touch operation corresponding to the predefined motion sensing action to a target game, so that the target game performs a response corresponding to the touch operation. In addition to including types of the touch operations (for example, tapping, double-tapping, sliding, and touch and hold), the instruction of the touch operation needs to further include a specific position (or coordinates) at which the touch operation is performed on a screen, that is, where the touch operation is performed on the screen.

In some examples, the mobile phone may set one or more default screen positions for the touch operations corresponding to the predefined motion sensing actions. That is, the user may not specifically set a screen position of a touch operation corresponding to a predefined motion sensing action. For example, in a game of Subway Parkour, the user may slide leftward/rightward/upward/downward on any position in a screen, and a game character walks to the left/walks to the right/jumps upward/crouches downward. Therefore, if a motion sensing action and a touch operation are set, for example, body left-leaning corresponding to sliding to the left is set, subsequently, after checking a motion sensing action of body left-leaning of the user, the mobile phone may send an instruction of sliding to the left, that is, send default coordinates (for example, coordinates of a center of a screen or coordinates of any position at the bottom of the screen) and an action of sliding to the left to the game of Subway Parkour. After receiving the instruction, the game of Subway Parkour considers that an operation of sliding to the left is received at a position of the default coordinates, and performs a response corresponding to the operation, that is, the game character walks to the left.

In some other examples, considering that the touch operation needs to be performed in a specific region on the screen, the target game can respond, when the mobile phone set a correspondence between predefined motion sensing actions and touch operations, the user may set positions at which the touch operations are performed on the screen.

A description is made by using an example in which the target game is Honor of Kings. In a game of Honor of Kings, when the user sets an attack key at the lower right, and when the user sets a predefined motion sensing action corresponding to the attack key, in addition to setting a touch operation corresponding to the predefined motion sensing action to tapping, the user further needs to set a position at which the touch operation is performed to be the same as a position of the original attack key in the target game. That is, a target position is set in a region in which the original attack key is located.

Figure 5F:
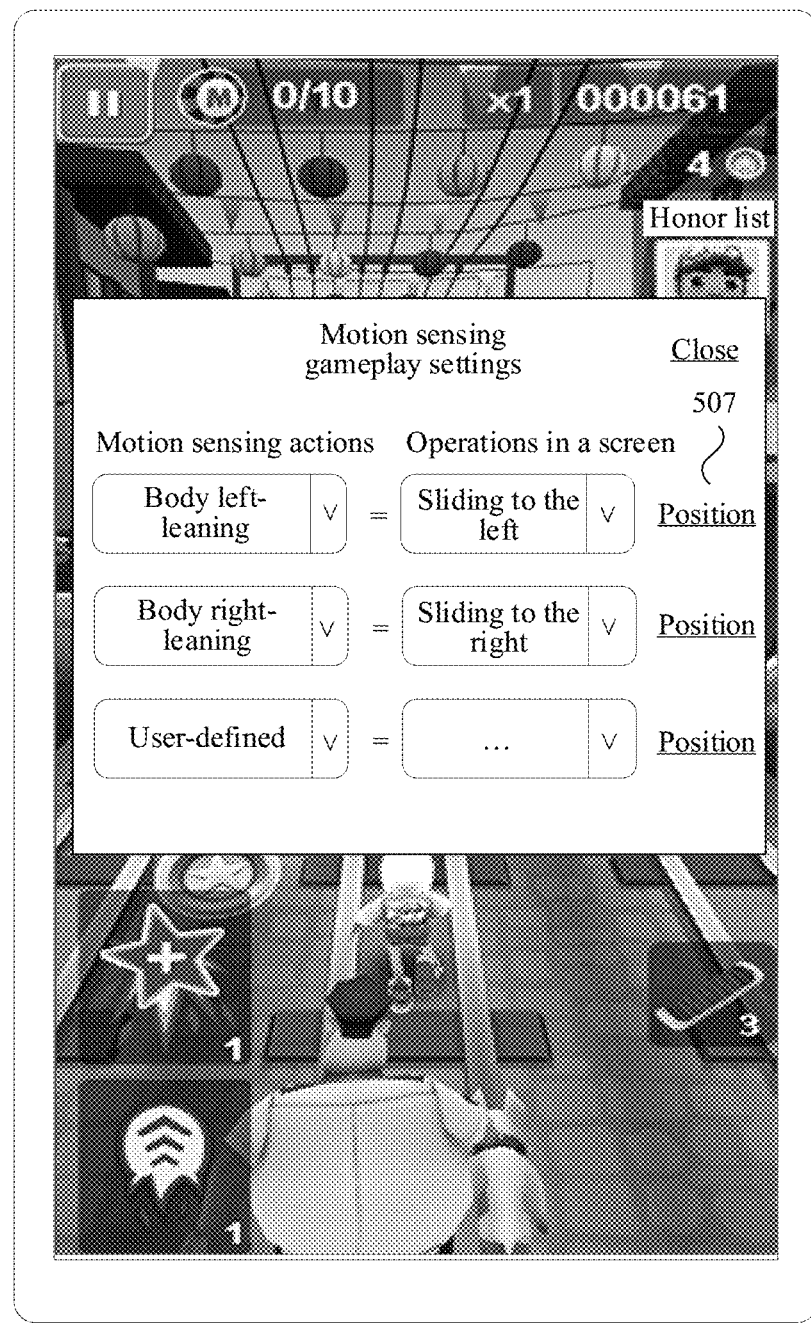
FIG. 5F is a schematic diagram of still some user interfaces of an electronic device according to an embodiment of this application.

For example, as shown in FIG. 5F, setting items of a motion sensing gameplay may further include a position control 507. The user may set, by using the position control 507, a position at which each touch operation that is set to correspond to a predefined motion sensing action is performed. In a specific implementation, in response to tapping of the user on a position control 507 corresponding to a predefined motion sensing action, the mobile phone prompts the user to select, on a screen, a position (or coordinates) at which a currently set touch operation is performed. The user may tap a target position (that is, a position at which the touch operation is required to be performed) on the screen, and the mobile phone records coordinates of the tapped position and sets the coordinates as coordinates at which the touch operation is performed. Certainly, the user may perform setting in a manner of inputting coordinates or selecting coordinates. This is not specifically limited in this embodiment of this application.

Table 2 is another example of a correspondence between set predefined motion sensing actions and touch operations in a target game (for example, Subway Parkour).

TABLE 2

| Predefined motion sensing actions | Touch operations in a target game | Position at which a corresponding touch operation is performed (unit: a pixel) |
|---|---|---|
| Body left-leaning | Sliding to the left on a screen | (200, 100) |
| Body right-leaning | Sliding to the right on the screen | (200, 300) |
| Crouching | Sliding downward on the screen | (100, 200) |
| Predefined motion sensing actions | Touch operations in a target game | Position at which a corresponding touch operation is performed (unit: a pixel) |
| Jumping up | Sliding upward on the screen | (300, 200) |
| Continuously jumping twice | Double-tapping on the screen | (200, 400) |
| . . . | . . . | |

Figure 5G:
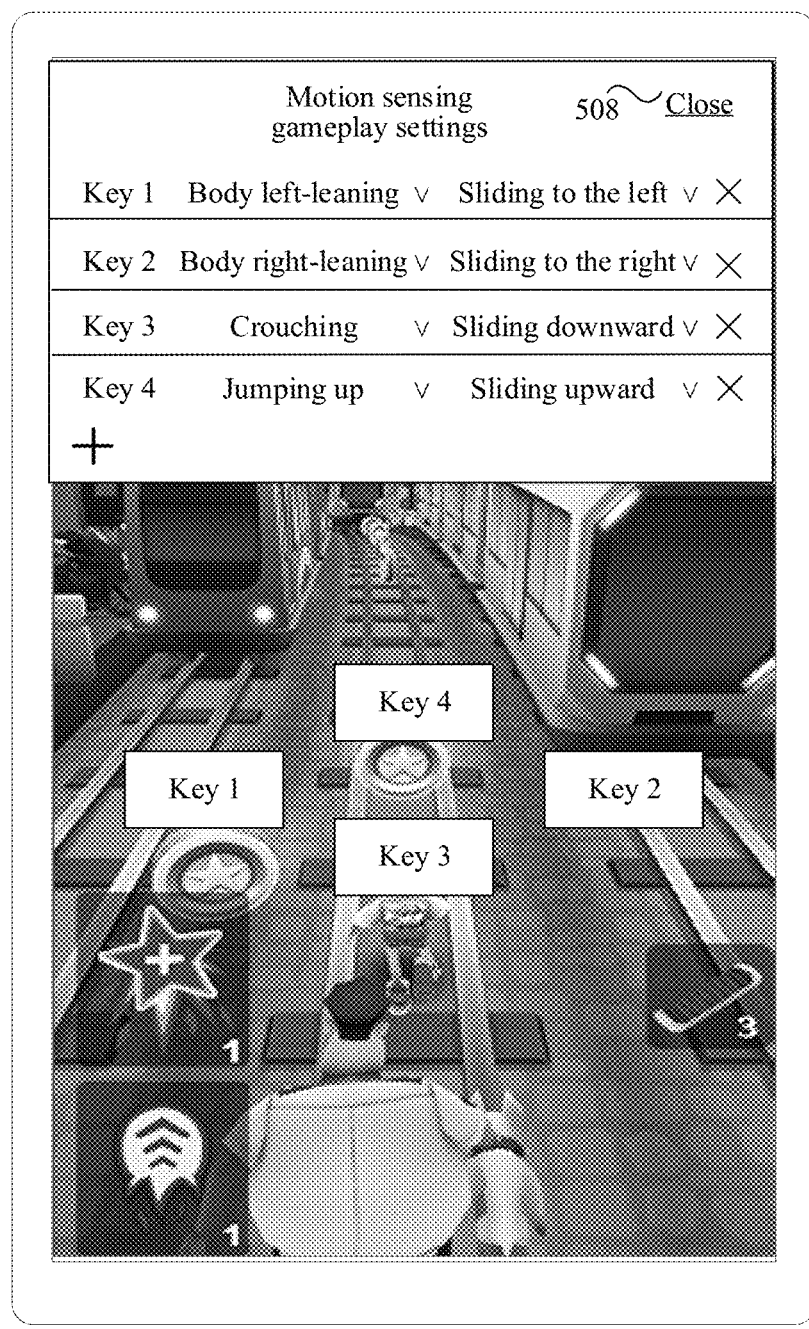
FIG. 5G is a schematic diagram of still some user interfaces of an electronic device according to an embodiment of this application.

In another example, as shown in FIG. 5G, when setting a predefined motion sensing action and a touch operation, the mobile phone may also display some keys such as a key 1 and a key 2 on the game interface. During setting, the keys may be associated with the predefined motion sensing actions. For example, body left-leaning (a predefined motion sensing action) is associated with an operation of sliding to the left (a touch operation) and the key 1. This means that a motion sensing action of body left-leaning is equivalent to that the user performs a touch operation of sliding to the left at a position of the key 1. That is, when detecting a motion sensing action of body left-leaning, the mobile phone sends the position of the key 1 and an instruction of sliding to the left to a target game.

Certainly, the user may change positions of the keys by moving the keys. Alternatively, the user may modify a quantity of keys by deleting or adding a control. It may be understood that the keys are displayed when the predefined motion sensing actions are set, so that the user clearly learns positions at which touch operations corresponding to the predefined motion sensing actions are performed. After setting is completed, the keys are not displayed in the game interface.

Table 3 is another example of a correspondence between set predefined motion sensing actions and touch operations in a target game (for example, Subway Parkour).

TABLE 3

| Key 1 | Predefined motion sensing actions | Touch operations in a target game |
|---|---|---|
| Key 2 | Body left-leaning | Sliding to the left on a screen |
| Key 3 | Body right-leaning | Sliding to the right on the screen |
| Key 4 | Crouching | Sliding downward on the screen |
| Key 5 | Jumping up | Sliding upward on the screen |
| Key 6 | Continuously jumping twice | Double-tapping on the screen |
| . . . | . . . | |

A position of the key 1 in the mobile phone screen is (200, 100), a position of the key 2 is (200, 300), a position of the key 3 is (100, 200), a position of the key 4 is (300, 200), and a position of the key 5 is (200, 400). The unit is pixel.

It may be understood that generally, different game applications also have some general touch operations. Therefore, the mobile phone may set the general touch operations to corresponding to a predefined motion sensing action by default. That is, the same touch operation in different game applications corresponds to the same predefined motion sensing action.

Alternatively, considering that game applications of the same type have more similar touch operations, therefore, a correspondence between predefined motion sensing actions and touch operations may be set for the game applications of the same type by default. That is, the same touch operation in the game applications of the same type corresponds to the same predefined motion sensing action, which helps reduce a memorizing burden of the user, so that the user maintains the same operating habit, thereby improving the universality of the predefined motion sensing action. In addition, costs of setting the predefined motion sensing action by the user can also be reduced.

Figure 5H:
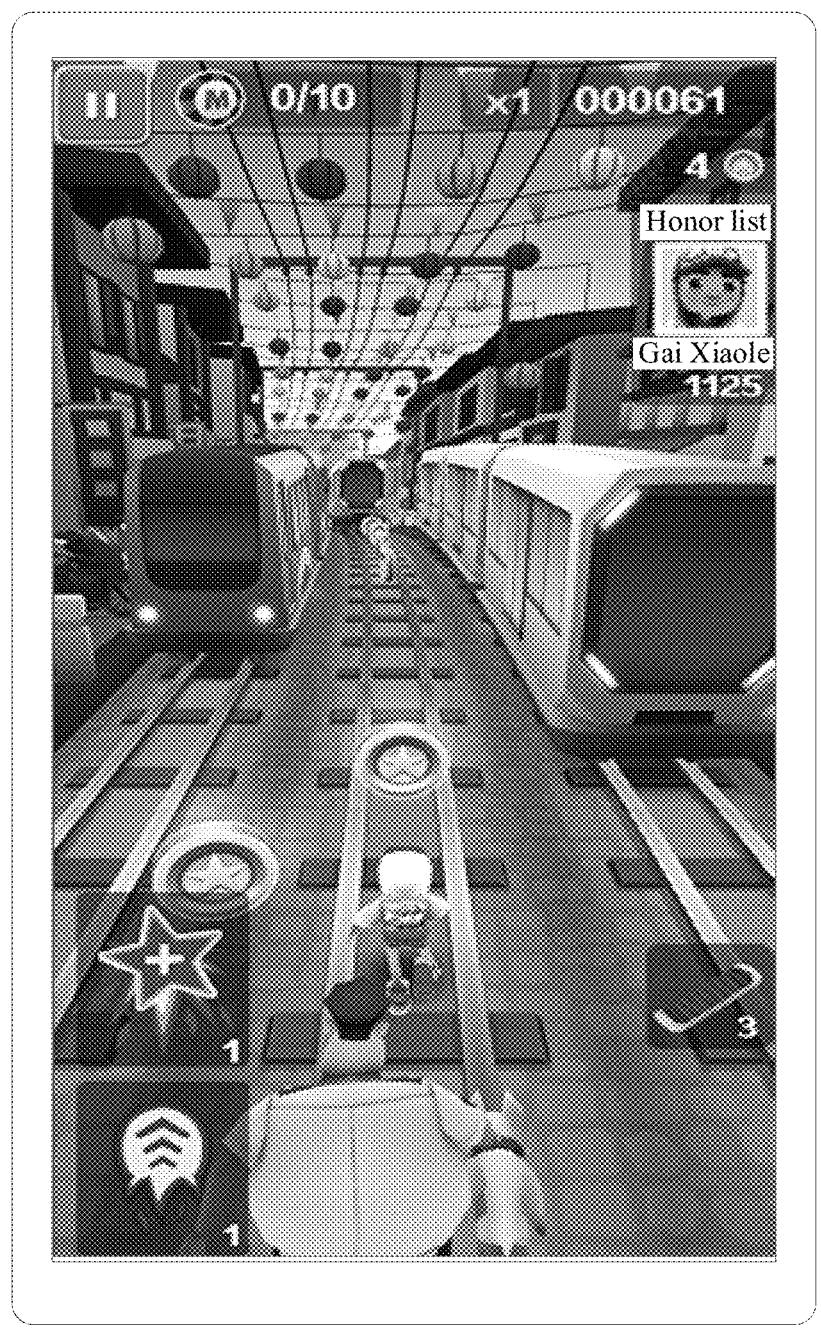
FIG. 5H is a schematic diagram of still some user interfaces of an electronic device according to an embodiment of this application.

After the predefined motion sensing action is set, the specific setting item of the function of the motion sensing gameplay may be closed by using a closing control 508 in FIG. 5G. As shown in FIG. 5H, the game interface is still displayed.

The foregoing description is made by using an example in which when a function of a motion sensing gameplay is first enabled, the motion sensing gameplay needs to be set. Subsequently, when the mobile phone enables the motion sensing gameplay again, the motion sensing gameplay may no longer need to be set, and the user can directly play a game by using a motion sensing action. Certainly, the mobile phone may alternatively support the user modifying the setting of the motion sensing gameplay.

The following describes a process in which the user may play a game by using a motion sensing gameplay (that is, control a target game by using a motion sensing action).

In some embodiments, to provide better visual experience for the user, the user may also be prompted to enable a screen mirroring function, and a game interface is projected to another large-screen electronic device (for example, a television) that is connected to a mobile phone. Alternatively, after detecting that a user enables a function of a motion sensing gameplay, the mobile phone automatically enables a screen mirroring function to project a game interface to another screen.

After the function of the motion sensing gameplay is enabled, the mobile phone (for example, a first application) may create a preview window of a camera. For example, the mobile phone may add a layer of a first application to a game interface of a target game application. The layer may include a preview window created by the first application, and other regions of the layer are transparent. In this way, the user may watch the game interface of the target game application and the newly created preview window of the camera simultaneously. Further, the user may check, by using the preview window, a predefined motion sensing action performed by the user, to determine whether the predefined motion sensing action of the user is correct. The camera called by the mobile phone may be one or more of front-facing cameras or may be one or more of rear-facing cameras. When the mobile phone includes a depth camera, the depth camera may also be called, to obtain depth data of an image of the user, so as to further determine postures such as body front-leaning/rear-leaning, lifting arms forward/backward, and lifting legs forward/backward of the user. The depth camera includes any one or several of a structured light camera, a binocular camera, a time of flight (TOF) camera, and the like.

In a specific example, a game interface displayed on the mobile phone is projected to a large-screen electronic device such as a television that is connected to the mobile phone, the mobile phone calls the rear-facing camera to capture an image of a user, then determines a motion sensing action of the user based on the captured image of the user, and determines whether the motion sensing action is a predefined motion sensing action.

Figure 5I:
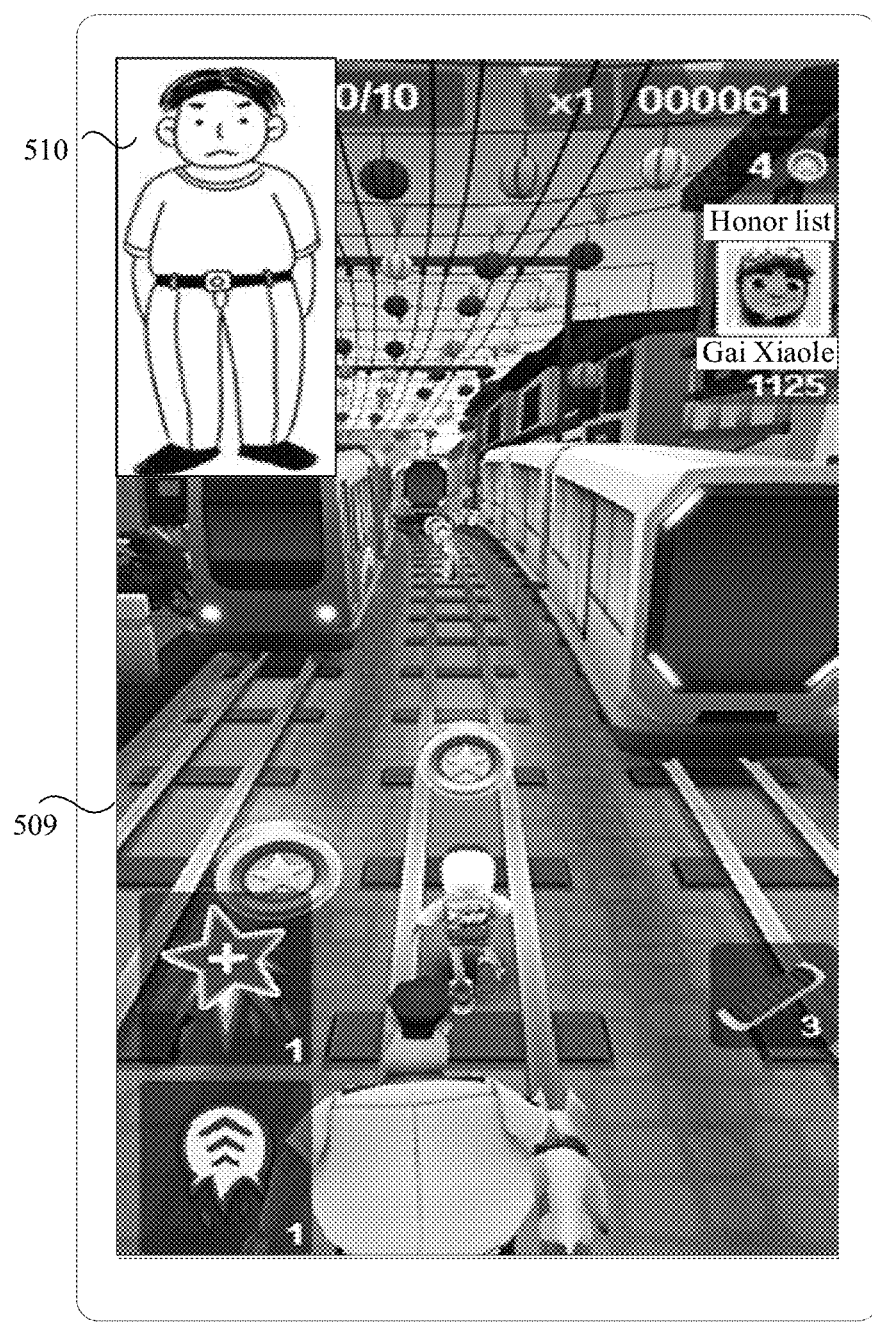
FIG. 5I is a schematic diagram of still some user interfaces of an electronic device according to an embodiment of this application.

FIG. 5I is a game interface 509 of a target game. The game interface 509 includes a preview window 510 of a camera. The user may adjust, by using the preview window 510 of the camera, a position at which the mobile phone is placed and determine a position at which a predefined motion sensing action is performed by the user. In some examples, the mobile phone may start calling a camera after a target game is started, or may start calling a camera after a game is started. The mobile phone may display a preview window of the camera all the time, so that the user checks, by using the preview window of the camera, a motion sensing action performed by the user, to determine whether the performed motion sensing action is correct. Certainly, after the user is familiar with the motion sensing gameplay, the preview window may be alternatively closed manually, or the preview window is automatically closed after the mobile phone displays the preview window for a period of time. In this way, the user may watch the game interface in full screen. This is not limited in this embodiment of this application.

Subsequently, when the user plays the target game, the camera of the mobile phone captures an image of the user in real time, analyzes the captured image of the user, recognizes a motion sensing action of the user, and determines whether the motion sensing action is a predefined motion sensing action. If the motion sensing action is the predefined motion sensing action, a touch operation corresponding to the predefined motion sensing action is searched for, an instruction of the corresponding touch operation is sent to the target game, and the target game performs a corresponding response. Therefore, an effect that the user controls the target game by using the predefined motion sensing action is achieved.

The following illustrates a specific implementation of recognizing a motion sensing action of a user.

First, the mobile phone performs bone point recognition on a captured user image (which is generally an RGB (red, green, blue) image, or may include a depth image captured by the depth camera), and converts a portrait in the user image into bone motion coordinates combined by bone points (and/or connection lines between bone points), to determine a motion sensing action corresponding to the user image. It can be seen that the bone motion coordinates include coordinate positions of the bone points in the portrait.

Figure 6A:
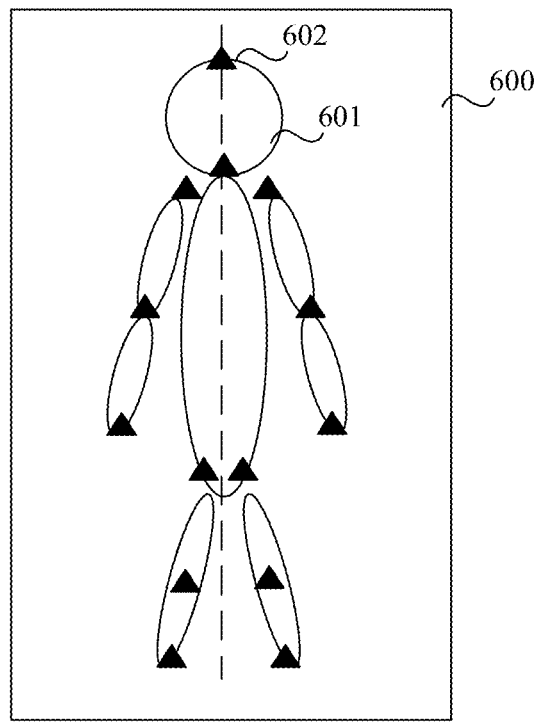
FIG. 6A is a schematic diagram of a method for recognizing bone points in a portrait according to an embodiment of this application.

For example, FIG. 6A is an image 600 captured by the mobile phone. The mobile phone may determine a portrait such as a portrait 601 in the image by using, for example, a portrait recognition technology. Subsequently, positions of joints such as elbow joints, wrist joints, and knee joints in the portrait 601 are determined by using a bone recognition technology (a process of estimating positions of human body joint points in an image or a video by using a computer vision technology), and the positioned joint points finally can form a human body bone image, which can reflect information such as a current posture (that is, a motion sensing action) of a human body or the like.

When the posture (that is, the motion sensing action) of the portrait is analyzed based on the bone motion coordinates, the posture of the portrait may be determined based on coordinate positions of the bone points, or may be determined based on a relative position relationship between the bone points, or may be determined based on a connection line between any two bone points. This is not limited in this embodiment of this application.

For example, FIG. 6A shows some recognized bone points in black triangles, and the bone points may include: a frontal bone 602, a cervical vertebra, a shoulder blade, an elbow joint, a wrist joint, a hip bone, a knee joint, an ankle joint, and the like. It may be understood that when more bone points are recognized, a recognized posture of a user is more accurate. Certainly, the mobile phone may determine, based on complexity of a predefined motion sensing action, that which bone points need to be recognized, to reduce the recognition of unnecessary bone points, thereby helping reduce a calculation amount and improving a processing capability of the mobile phone. This is not limited in this embodiment of this application.

In some examples, the posture of the user may be directly determined based on coordinates of the bone points, or a relative position relationship between the bone points, or connection lines between the bone points. In some other examples, a reference portrait may be alternatively preset, that is, reference coordinates or positions of bone points are set in the reference portrait. Subsequently, when the posture of the user is determined, the posture of the user may be determined based on a position relative relationship between bone points in a to-be-determined portrait and the bone points in the reference portrait. The reference coordinates of the bone points in the reference portrait may be an average value of bone points determined based on different portraits in massive pictures. The reference coordinates of the bone points in the reference portrait may be alternatively coordinate values of bone points determined based on an image of a specific person (for example, a user of a mobile phone). This is not specifically limited in this embodiment of this application.

For example, it can be learned from coordinates of bone points in the portrait 601 that a connection line between the frontal bone 602 and the cervical vertebra is parallel to (or approximately parallel to) a vertical direction and coordinates of other bone points are also in a specific position relationship. Therefore, it may be determined that a user in the portrait 601 is standing upright, and hands hang naturally.

Figure 6B:
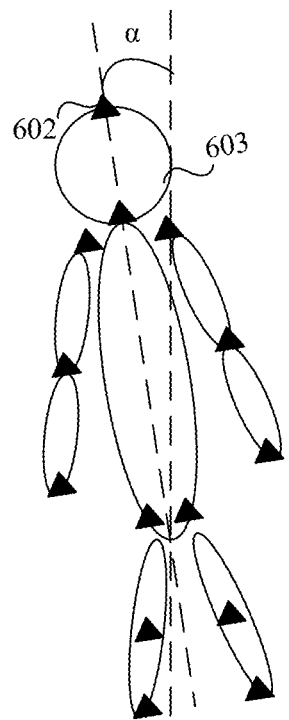
FIG. 6B is a schematic diagram of another method for recognizing bone points in a portrait according to an embodiment of this application.

In another example, in a portrait 603 shown in FIG. 6B, it can be learned from coordinates of bone points in the portrait 603 that a connection line between the frontal bone 602 and the cervical vertebra forms a specific angle with the vertical direction (for example, counterclockwise rotating by a degrees, a being greater than 10 degrees and less than 90 degrees). Therefore, it may be determined that a user in the portrait 603 is in a posture leaning to the left. In some other examples, the coordinates of the bone points in the portrait 601 may be alternatively set as a reference, and a portrait of which a posture needs to be determined is compared with the reference. For example, the connection line between the frontal bone 602 and the cervical vertebra in the portrait 603 forms a specific angle (for example, counterclockwise rotating by β degrees, β being greater than 10 degrees and less than 90 degrees) with the connection line between the frontal bone 602 and the cervical vertebra in the portrait 601. Therefore, it may be determined that the user in the portrait 603 is in a posture of leaning to the left.

Figure 6C:
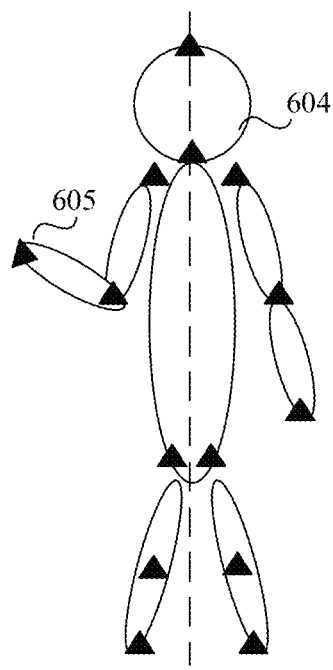
FIG. 6C is a schematic diagram of another method for recognizing bone points in a portrait according to an embodiment of this application.

In another example, a description is still made by using an example in which the coordinates of the bone points in the portrait 601 are set as a reference. In a portrait 604 shown in FIG. 6C, a wrist joint 605 of a left hand in the portrait 604 is closer to the upper left than coordinates of a wrist joint of a left hand in the portrait 601, and coordinates of remaining bone points are almost unchanged. Therefore, it may be determined that a user is in a posture of lifting a left forearm.

Figure 6D:
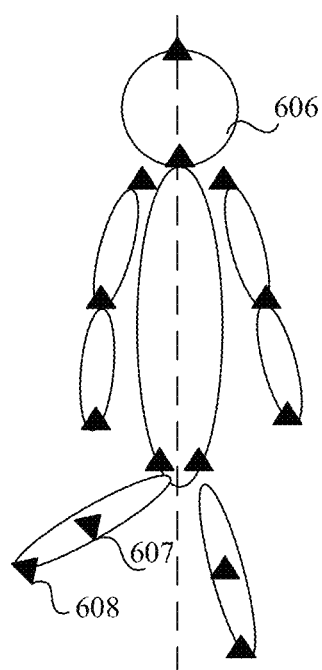
FIG. 6D is a schematic diagram of another method for recognizing bone points in a portrait according to an embodiment of this application.

In another example, a description is still made by using an example in which the coordinates of the bone points in the portrait 601 are set as a reference. In a portrait 606 shown in FIG. 6D, a knee joint 607 of a left leg and a wrist joint 608 of a left foot in the portrait 606 is closer to the upper left than a knee joint of a left leg and a wrist joint of a left foot in the portrait 601, and coordinates of remaining bone points are almost unchanged. Therefore, it may be determined that a user is in a posture of lifting the left leg.

It should be noted that, the foregoing descriptions are made by using an RGB image captured by the mobile phone as an example. It may be understood that the mobile phone may alternatively call the depth camera to obtain depth data of a portrait in an image. In this way, more postures may be further determined based on the depth data.

Figure 6E:
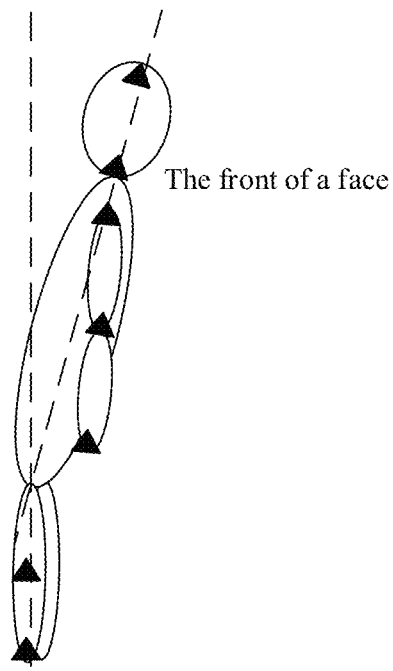
FIG. 6E is a schematic diagram of another method for recognizing bone points in a portrait according to an embodiment of this application.

For example, FIG. 6E is a schematic diagram of a profile when an upper body of a user is leaning forward. As can be seen from FIG. 6E, if depth data of bone points (for example, the frontal bone 602, the shoulder blade, the elbow joint, and the wrist joint) of an upper body of a portrait in an image is smaller than depth data of bone points of a lower body, it can be learned that the upper body is closer to the camera of the mobile phone. Therefore, it may be determined that the portrait in the image is leaning forward. Similarly, if depth data of bone points of the upper body of the portrait is larger than the depth data of the bone points of the lower body, it can be learned that the upper body is farther away from the camera of the mobile phone. Therefore, it may be determined that the portrait in the image is leaning backward.

Alternatively, a reference image is preset. If it is determined that depth data of bone points of an upper body of a portrait in an image is smaller than depth data of bone points of an upper body of a reference portrait, it may be determined that the portrait in the image is leaning forward. If it is determined that depth data of bone points of an upper body of a portrait in an image is larger than the depth data of the bone points of the upper body of the reference portrait, it may be determined that the portrait in the image is leaning backward.

Figure 6F:
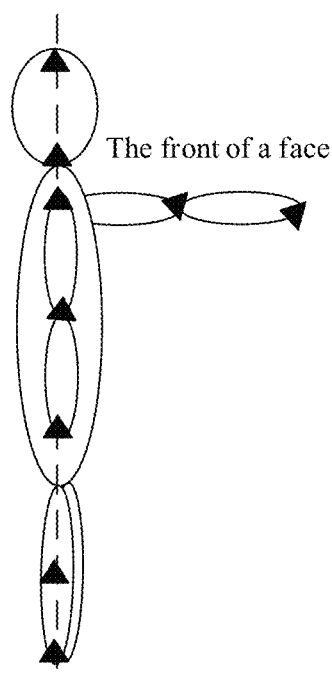
FIG. 6F is a schematic diagram of another method for recognizing bone points in a portrait according to an embodiment of this application.

In another example, FIG. 6F is a schematic diagram of a profile when a left arm of a user extends forward. As can be learned from FIG. 6F, if depth data of bone points (for example, a left elbow joint and a left wrist joint) of a left arm in an image is smaller than depth data of other bone points, it can be learned that the left arm is closer to the camera of the mobile phone. Therefore, it may be determined that the left arm of a portrait in the image is extending forward. Similarly, if depth data of bone points of a left arm of a portrait is larger than depth data of other bone points, it can be learned that the left arm is farther away from the camera of the mobile phone. Therefore, it may be determined that the left arm of the portrait in the image is extending backward.

It may be understood that another method for recognizing a portrait posture (that is, a motion sensing action) in an image or a video may be alternatively used. This is not limited in this embodiment of this application.

Figure 7:
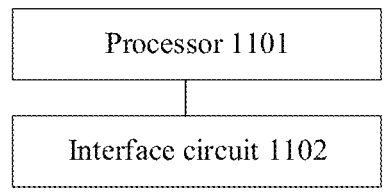
FIG. 7 is a schematic structural diagram of a circuit system according to an embodiment of this application.

An embodiment of this application further provides a circuit system shown in FIG. 7. The circuit system includes at least one processor 1101 and at least one interface circuit 1102. The processor 1101 may be interconnected to the interface circuit 1102 by using a line. For example, the interface circuit 1102 may be configured to receive a signal from another apparatus (for example, a memory of an electronic device 100). In another example, the interface circuit 1102 may be configured to send a signal to another apparatus (for example, the processor 1101). For example, the interface circuit 1102 may read instructions stored in the memory and send the instructions to the processor 1101. The instructions, when executed by the processor 1101, may cause an electronic device to perform steps performed by the electronic device 100 (for example, the mobile phone) in the foregoing embodiments. Certainly, the circuit system may further include another discrete device. This is not specifically limited in this embodiment of this application.

It may be understood that, to implement the foregoing functions, the foregoing terminal includes a corresponding hardware structure and/or software modules for performing the functions. A person skilled in the art should be easily aware that, in combination with units and algorithm steps of the examples described in the embodiments disclosed in this specification, the embodiments of this application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the embodiments of the present disclosure.

In this embodiment, functional modules of the terminal may be obtained through division according to the foregoing method examples. For example, the functional modules may be obtained through division corresponding to various functions, or two or more functions may be integrated into one processing module. The integrated module may be implemented in the form of hardware, or may be implemented in the form of a software functional module. It should be noted that, in this embodiment of the present disclosure, the division of the modules is merely an example, and is merely division of logical functions. During actual implementation, there may be another division manner.

The foregoing descriptions about implementations allow a person skilled in the art to understand that, for the purpose of convenient and brief description, division of the foregoing functional modules is used as an example for illustration. In actual application, the foregoing functions can be allocated to and implemented by different modules according to a requirement, that is, an inner structure of an apparatus is divided into different functional modules to implement all or part of the functions described above. For a specific work process of the system, apparatus and unit described above, a corresponding process in the aforementioned method embodiments may be referred to, and the details are not described herein again.

Functional units in the embodiments of this application can be integrated into one processing unit, or each of the units can exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

A person of skill in the art may also understand that when the integrated unit is implemented in the form of a software functional unit and sold or used as an independent product, the integrated unit may be carried in one or a series of signals propagated by using a communication network. The signal may be an electrical signal, an optical signal, a sound wave signal, a radio signal, or a signal in another form. An end user may download the software to a local device (for example, a personal computer, a mobile phone, or a tablet computer) by using the signal.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be used as protection scope of the claims.

What is claimed is:

1. A method for application running, the method comprising:
displaying, by an electronic device that includes at least one camera and a touch screen, a first picture of a first application, wherein the first application supports a user controlling the first application through a touch operation on the touch screen;
receiving, by the electronic device, an operation in which the user enables a first function;
enabling, by the electronic device, the first function in response to the operation in which the user enables the first function, wherein the first function is a function of which the first application supports the user controlling the first application through a motion sensing action;
adding, by the electronic device, a layer to the first picture of the first application, wherein the layer comprises a non-transparent region and a transparent region, and the non-transparent region displays a setting interface of the first function;
capturing, by the electronic device, a first image of the user by using the at least one camera, and recognizing a first motion sensing action of the user in the first image;
determining, by the electronic device, first touch operation information corresponding to the first motion sensing action, wherein the first touch operation information comprises a type of a first touch operation and a position at which the first touch operation is performed on the touch screen; and
performing, by the electronic device, an operation corresponding to the first touch operation in response to determining the first touch operation information corresponding to the first motion sensing action.

2. The method according to claim 1, wherein the performing, by the electronic device, the operation corresponding to the first touch operation comprises:
displaying, by the electronic device, a second picture of the first application, wherein the second picture is the same as a picture displayed by the electronic device in response to the user performing the first touch operation.

3. The method according to claim 1, wherein the determining, by the electronic device, the first touch operation information corresponding to the first motion sensing action comprises:
calling, by the electronic device, an interface of an application framework layer; and
determining, by the electronic device, the first touch operation information corresponding to the first motion sensing action.

4. The method according to claim 1, further comprising:
receiving, by the electronic device, an operation in which the user sets a correspondence between a given motion sensing action and a given touch operation by using the setting interface of the first function, wherein the given touch operation comprises a type of the given touch operation and a position at which the given touch operation is performed on the touch screen.

5. The method according to claim 4, further comprising:
storing, by the electronic device, the setting of the user for the correspondence between the given motion sensing action and the given touch operation; and adding, by the electronic device, a second layer to the first picture of the first application, wherein the second layer comprises a non-transparent region and a transparent region, and the non-transparent region displays a preview window of the at least one camera.

6. An electronic device, comprising:
at least one processor;
a touch screen; and
at least one camera,
wherein the touch screen and the at least one camera are coupled with the processor;
wherein the touch screen is configured to display a first picture of a first application, wherein the first application supports a user controlling the first application through a touch operation on the touch screen;
wherein the at least one camera is configured to capture a first image of the user; and
wherein the at least one processor is configured to:
receive an operation in which the user enables a first function;
enable the first function in response to the operation in which the user enables the first function, wherein the first function is a function of which the first application supports the user controlling the first application through a motion sensing action;
add a layer to the first picture of the first application, wherein the layer comprises a non-transparent region and a transparent region, and the non-transparent region displays a setting interface of the first function;
recognize a first motion sensing action of the user in the first image;
determine first touch operation information corresponding to the first motion sensing action, wherein the first touch operation information comprises a type of a first touch operation and a position at which the first touch operation is performed on the touch screen; and
perform an operation corresponding to the first touch operation in response to determining the first touch operation information corresponding to the first motion sensing action.

7. The electronic device according to claim 6, wherein the performing the operation corresponding to the first touch operation comprises:
controlling the touch screen to display a second picture of the first application, wherein the second picture is the same as a picture displayed by the electronic device in response to the user performing the first touch operation.

8. The electronic device according to claim 6, wherein the determining the first touch operation information corresponding to the first motion sensing action comprises:
calling an interface of an application framework layer of the electronic device; and
determining the first touch operation information corresponding to the first motion sensing action.

9. The electronic device according to claim 6, wherein the at least one processor is further configured to:
receive an operation in which the user sets a correspondence between a given motion sensing action and a given touch operation by using the setting interface of the first function, wherein the given touch operation comprises a type of the given touch operation and a position at which the given touch operation is performed on the touch screen.

10. The electronic device according to claim 9, wherein the least one processor is further configured to:
- store the setting of the user for the correspondence between the given motion sensing action and the given touch operation; and
- add a second layer to the first picture of the first application, wherein the second layer comprises a non-transparent region and a transparent region, and the non-transparent region displays a preview window of the at least one camera.

11. A non-transitory computer storage medium, comprising computer instructions, wherein the computer instructions, when run on an electronic device that includes at least one camera and a touch screen, cause the electronic device to perform an application running method comprising:
- displaying a first picture of a first application, wherein the first application supports a user controlling the first application through a touch operation on the touch screen;
- receiving an operation in which the user enables a first function;
- enabling the first function in response to the operation in which the user enables the first function, wherein the first function is a function of which the first application supports the user controlling the first application through a motion sensing action;
- adding a layer to the first picture of the first application, wherein the layer comprises a non-transparent region and a transparent region, and the non-transparent region displays a setting interface of the first function;
- capturing a first image of the user by using the at least one camera, and recognizing a first motion sensing action of the user in the first image;
- determining first touch operation information corresponding to the first motion sensing action, wherein the first touch operation information comprises a type of a first touch operation and a position at which the first touch operation is performed on the touch screen; and
- performing an operation corresponding to the first touch operation in response to determining the first touch operation information corresponding to the first motion sensing action.

12. The non-transitory computer storage medium according to claim 11, wherein the performing the operation corresponding to the first touch operation comprises:
- controlling the touch screen to display a second picture of the first application, wherein the second picture is the same as a picture displayed by the electronic device in response to the user performing the first touch operation.

13. The non-transitory computer storage medium according to claim 11, wherein the determining the first touch operation information corresponding to the first motion sensing action comprises:
- calling an interface of an application framework layer of the electronic device; and
- determining the first touch operation information corresponding to the first motion sensing action.

14. The non-transitory computer storage medium according to claim 11, wherein the electronic device performing the application running method further comprises:
- receiving an operation in which the user sets a correspondence between a given motion sensing action and a given touch operation by using the setting interface of the first function, wherein the given touch operation comprises a type of the given touch operation and a position at which the given touch operation is performed on the touch screen.

15. The non-transitory computer storage medium according to claim 14, wherein the electronic device performing the application running method further comprises:
- storing the setting of the user for the correspondence between the given motion sensing action and the given touch operation; and
- adding a second layer to the first picture of the first application, wherein the second layer comprises a non-transparent region and a transparent region, and the non-transparent region displays a preview window of the at least one camera.

\* \* \* \* \*